(12) United States Patent
Hariya et al.

(10) Patent No.: US 8,856,906 B2
(45) Date of Patent: Oct. 7, 2014

(54) AUTHENTICATION PROCESSING METHOD AND SYSTEM

(75) Inventors: Osamu Hariya, Kanazawa (JP);
Takayoshi Kurita, Kawasaki (JP);
Hiroshi Maeyama, Kanazawa (JP);
Masafumi Kobayashi, Kanazawa (JP)

(73) Assignee: Fujitsu Limited, Kawasaki (JP)

( * ) Notice: Subject to any disclaimer, the term of this patent is extended or adjusted under 35 U.S.C. 154(b) by 1444 days.

(21) Appl. No.: 12/050,518

(22) Filed: Mar. 18, 2008

(65) Prior Publication Data

US 2008/0244719 A1 Oct. 2, 2008

(30) Foreign Application Priority Data

Mar. 27, 2007 (JP) .................................. 2007-80532

(51) Int. Cl.
*H04L 29/06* (2006.01)
*G06F 21/41* (2013.01)
(52) U.S. Cl.
CPC ............. *H04L 63/08* (2013.01); *H04L 63/0815* (2013.01); *G06F 21/41* (2013.01)
USPC ................................... 726/8; 726/4; 713/168

(58) Field of Classification Search
CPC ......... G06F 21/41; G06F 21/31; H04L 63/08; H04L 63/0815; H04L 63/083
USPC ........................................................... 726/8
See application file for complete search history.

(56) References Cited

U.S. PATENT DOCUMENTS

| | | | |
|---|---|---|---|
| 5,875,296 A * | 2/1999 | Shi et al. | 726/5 |
| 6,339,423 B1 * | 1/2002 | Sampson et al. | 715/854 |
| 7,092,370 B2 * | 8/2006 | Jiang et al. | 370/329 |
| 2003/0037131 A1 * | 2/2003 | Verma | 709/223 |
| 2004/0002878 A1 * | 1/2004 | Maria Hinton | 705/7 |
| 2009/0013395 A1 * | 1/2009 | Marcus et al. | 726/8 |
| 2010/0198911 A1 * | 8/2010 | Zhang et al. | 709/203 |

* cited by examiner

*Primary Examiner* — Yogesh Paliwal
(74) *Attorney, Agent, or Firm* — Greer Burns & Crain Ltd.

(57) ABSTRACT

A plurality of authentication servers belonging to different domains are connected to achieve a Single Sign-On using two cookies in two management systems.

19 Claims, 29 Drawing Sheets

FIG. 5

| COOKIE NAME | COOKIE VALUE | NOTIFICATION RANGE OF COOKIE | |
|---|---|---|---|
| AUTHSYSTEM | LOCAL | https://auth.a.com/sys | COOKIE A |
| AUTHSYSTEM | sysA | https://auth.b.com/sys | COOKIE B |

FIG. 19

| COOKIE NAME | COOKIE VALUE | NOTIFICATION RANGE OF COOKIE |
|---|---|---|
| AUTHSYSTEM | LOCAL | https://set.a.com/set |
| AUTHSYSTEM | sysA | https://set.b.com/set |

AUTHENTICATION PROCESSING METHOD AND SYSTEM

TECHNICAL FIELD

The present invention relates to an authentication processing technique.

BACKGROUND ART

SAML (Security Assertion Markup Language) (Ver.2) exists as a standard rule for connecting a plurality of authentication systems. Use of SAML permits achievement of Single Sign-On by which a plurality of Web systems or the like can be used on one single authentication. To use a plurality of Web systems requiring authentication, a user heretofore had to enter authentication information in each Web system. This took time and it was also troublesome to manage authentication data (IDs, passwords, etc.). If Web systems are conformable to SAML, a Web system as a source of movement can communicate with a Web system as a destination of movement by SAML protocol to hand over authentication data automatically when the user moves to the destination Web system.

In SAML, it is necessary to present information as to what authentication system authenticates a user (i.e. authentication destination system information) to authentication servers. In SAML 2.0, authentication destination system information is stored in a user terminal in the form of a cookie which can be received by all authentication servers. Specifically, as shown in FIG. 1, one cookie "Server1" indicating Authentication Server 1 is set in a Web browser of a user terminal by a common cookie setting service. To inform both Authentication Server 1 and Authentication Server 2 of this cookie, Authentication Servers 1 and 2 are heretofore defined in one domain (e.g. common domain common.com) and host names different in authentication servers are set in DNS (Domain Name Server) in the common domain.

In view of setting and action of DNS, it is however practically difficult to let a plurality of authentication servers different in management source (e.g. server1.a.com and server2.other.com in FIG. 1) take part in a common domain (e.g. server1.common.com and server2.common.com).

SUMMARY

According to an aspect of an embodiment, an authentication processing method is executed in a system having a plurality of groups each having a service system, an authentication server for the service system and a cookie setting service. The method includes the steps of:

operating a first cookie setting service for setting a first cookie in a specific user terminal in response to a request from the specific user terminal, the first cookie indicating use of a first authentication server belonging to the same group as the first cookie setting service and having at least the first cookie setting service as a notification range; and operating a second cookie setting service for setting a second cookie in the specific user terminal when the second cookie setting service receives a cookie setting request from the first cookie setting service via the specific user terminal, the second cookie indicating use of the first authentication server belonging to the same group as the first cookie setting service and having at least the second cookie setting service as a notification range.

BRIEF DESCRIPTION OF THE DRAWINGS

FIG. 5 shows an example of configuration of a cookie in a user terminal in Embodiment 1 of the present invention.

FIG. 19 shows an example of configuration of a cookie in a user terminal in Embodiment 2 of the present invention.

DETAILED DESCRIPTION OF THE EMBODIMENT

Figure 1:
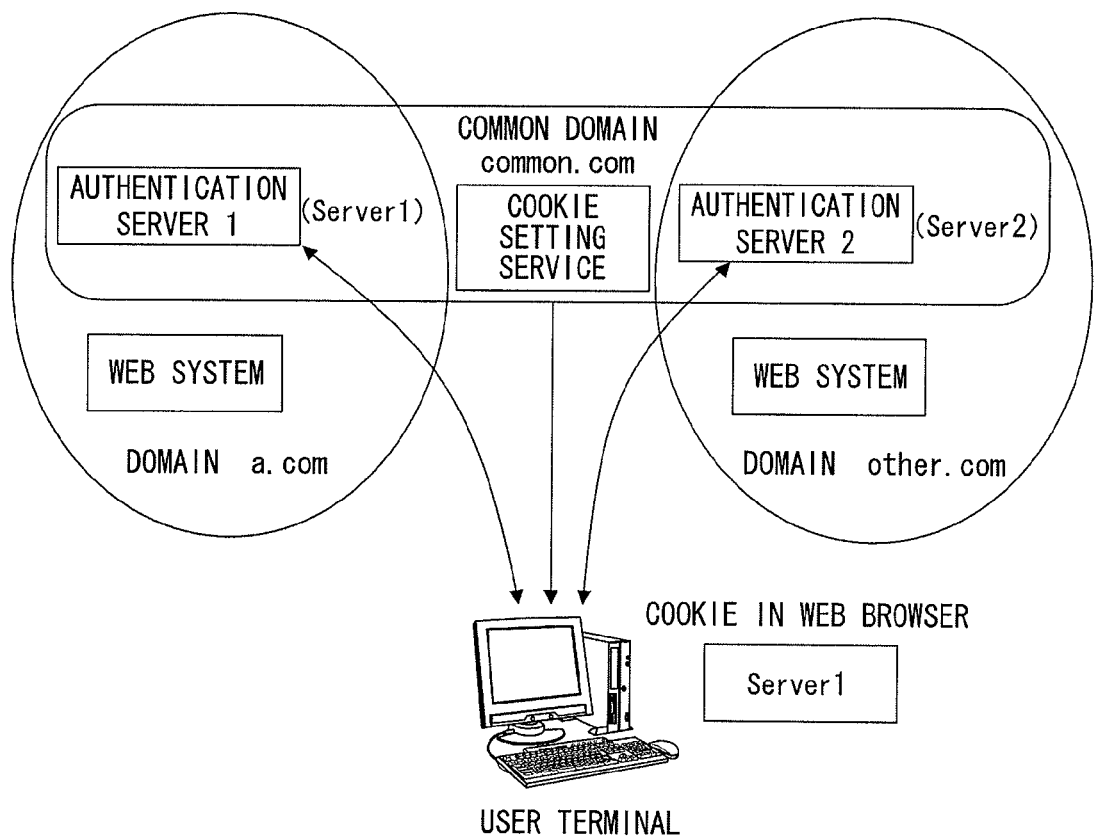
FIG. 1 shows configuration in the background art.
Figure 2:
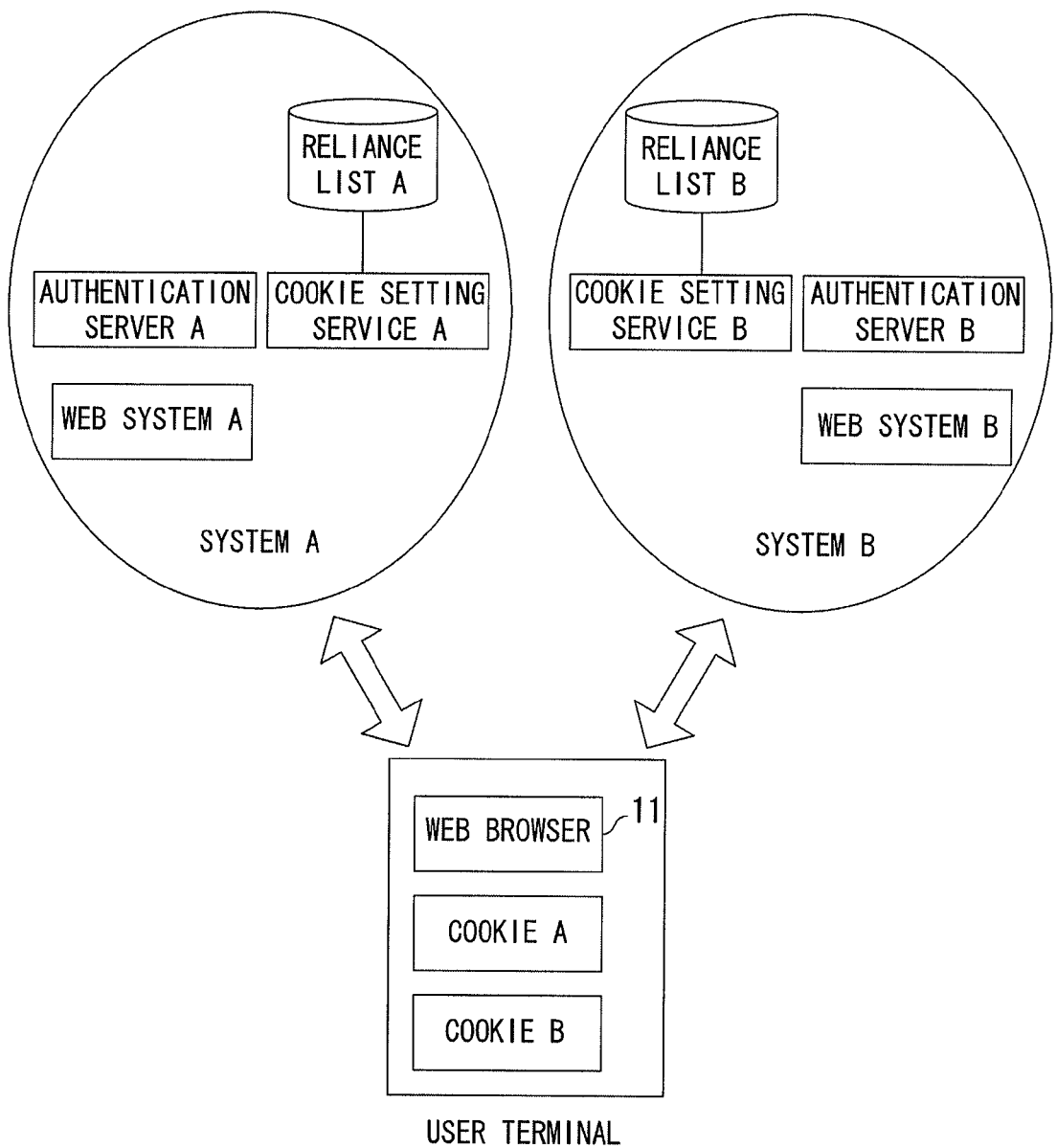
FIG. 2 shows a system outline according to the present invention.

FIG. 2 shows a system outline according to an embodiment of the present invention. In this embodiment, two or more systems work collaboratively. In the example shown in FIG.

2, there are System A and System B. Each system includes an authentication server (Authentication Server A or B), a service providing system such as a Web system (Web System A or B), a cookie setting service (Cookie Setting Service A or B) for performing the following process, and a reliance list (Reliance List A or B) used by the cookie setting service. The cookie setting service may be provided in either authentication server or server of the Web system or may be provided in another server. The number of computers forming the Web system may not be one but plural. Servers in respective systems are connected by a network. The respective systems are also connected by the network. User terminals are connected to the network. A Web browser 11 is installed in each user terminal. Incidentally, the Web browser 11 manages Cookie A for System A and Cookie B for System B which will be described hereunder.

[Embodiment 1]

Figure 3:
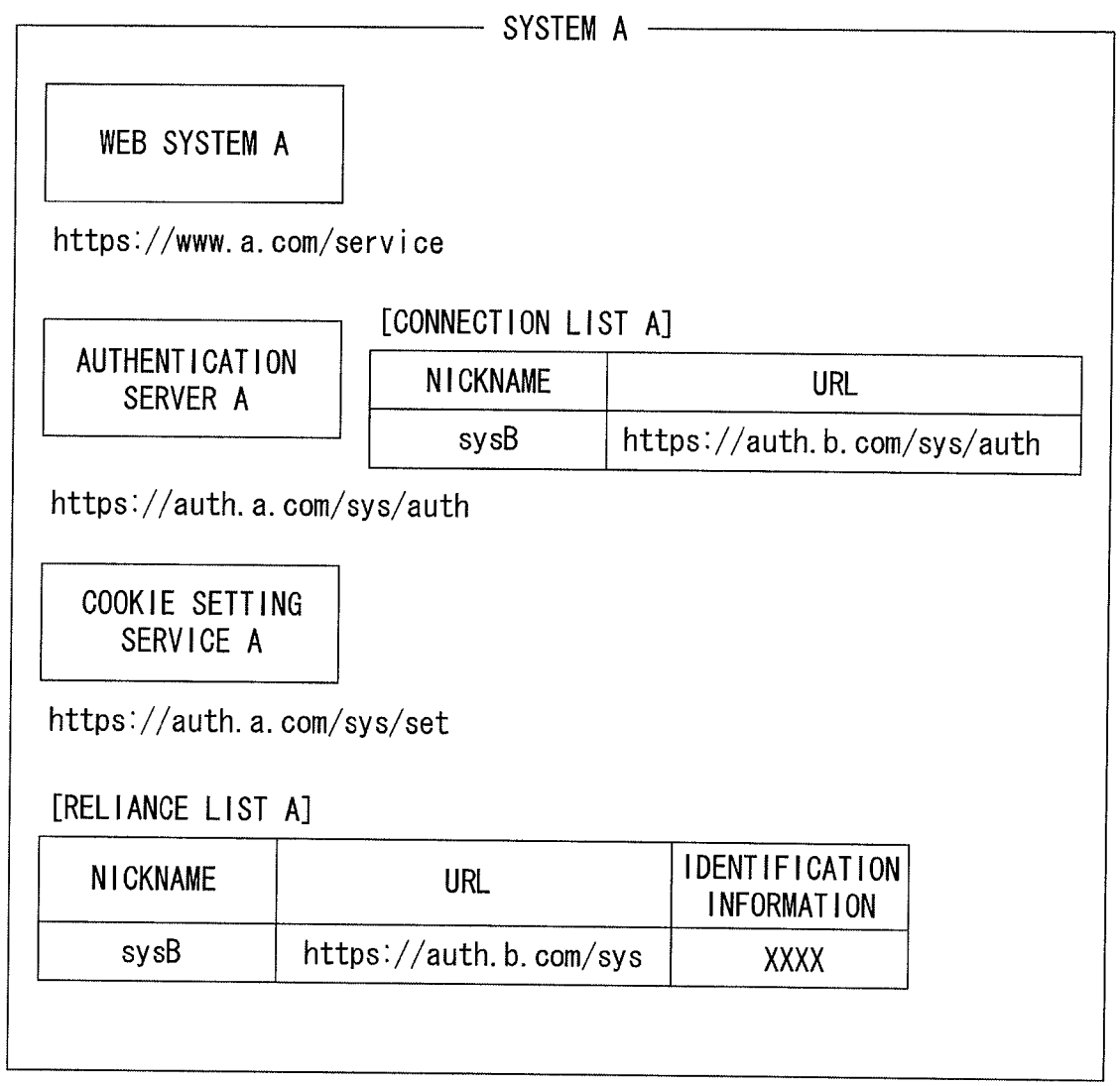
FIG. 3 shows the configuration of System A in Embodiment 1 of the present invention.
Figure 4:
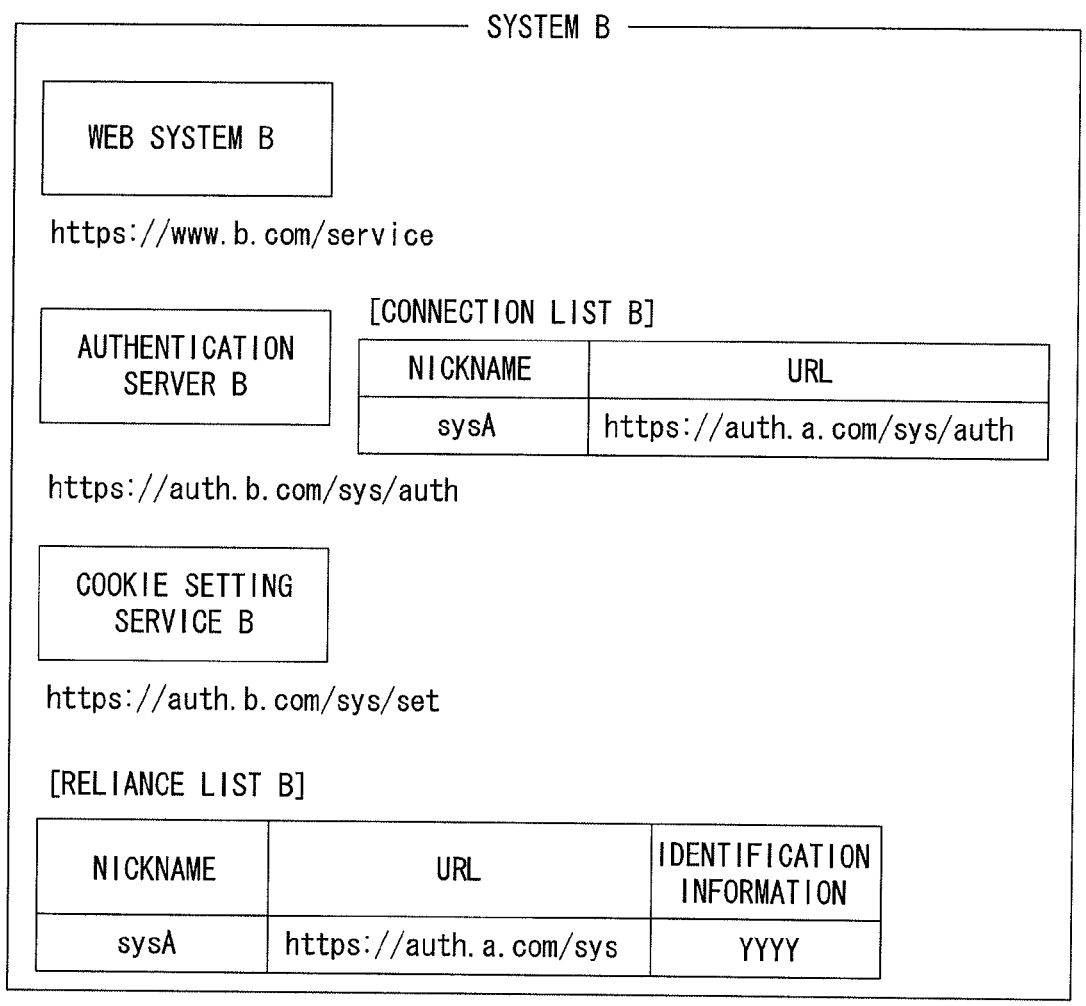
FIG. 4 shows the configuration of System B in Embodiment 1 of the present invention.

FIGS. 3 and 4 show the configuration of systems in Embodiment 1 of the invention. FIG. 3 shows the configuration of System A in Embodiment 1. In this embodiment, the URL (Uniform Resource Locator) of Web System A is https://www.a.com/service, the URL of Authentication Server A is https://auth.a.com/sys/auth, and the URL of Cookie Setting Service A is https://auth.a.com/sys/set. Authentication Server A holds Connection List A in which a nickname sysB and a URL https://auth.b.com/sys/auth are registered. A nickname sysB, a URL https://auth.b.com/sys and identification information XXXX are registered in Reliance List A.

FIG. 4 shows the configuration of System B in Embodiment 1. In this embodiment, the URL (Uniform Resource Locator) of Web System B is https://www.b.com/service, the URL of Authentication Server B is https://auth.b.com/sys/auth, and the URL of Cookie Setting Service B is https://auth.b.com/sys/set. Authentication Server B holds Connection List B in which a nickname sysA and a URL https://auth.a.com/sys/auth are registered. A nickname sysA, a URL https://auth.a.com/sys and identification information YYYY are registered in Reliance List B.

As described above, there is registration that Authentication Server A is connected with Authentication Server B and Authentication Server B is connected with Authentication Server A. Authentication Server A and Cookie Setting Service A are arranged under https://auth.a.com/sys. Authentication Server B and Cookie Setting Service B are arranged under https://auth.b.com/sys. Service or the like of System B under https://auth.b.com/sys is registered in Reliance List A. Service or the like of System A under https://auth.a.com/sys is registered in Reliance List B.

FIG. 5 shows an example of cookies registered in a user terminal in Embodiment 1. In the example shown in FIG. 5, Cookie A corresponds to the first line, and Cookie B corresponds to the second line. Cookie A includes a cookie name "AUTHSYSTEM", a cookie value "LOCAL" (nickname indicating a notification range itself), and a cookie notification range https://auth.a.com/sys. The notification range of Cookie A includes Authentication Server A, and Cookie Setting Service A. Cookie B includes a cookie name "AUTHSYSTEM", a cookie value "sysA" (nickname of System A), and a cookie notification range https://auth.b.com/sys. The notification range of Cookie B includes Authentication Server B, and Cookie Setting Service B.

Figure 6:
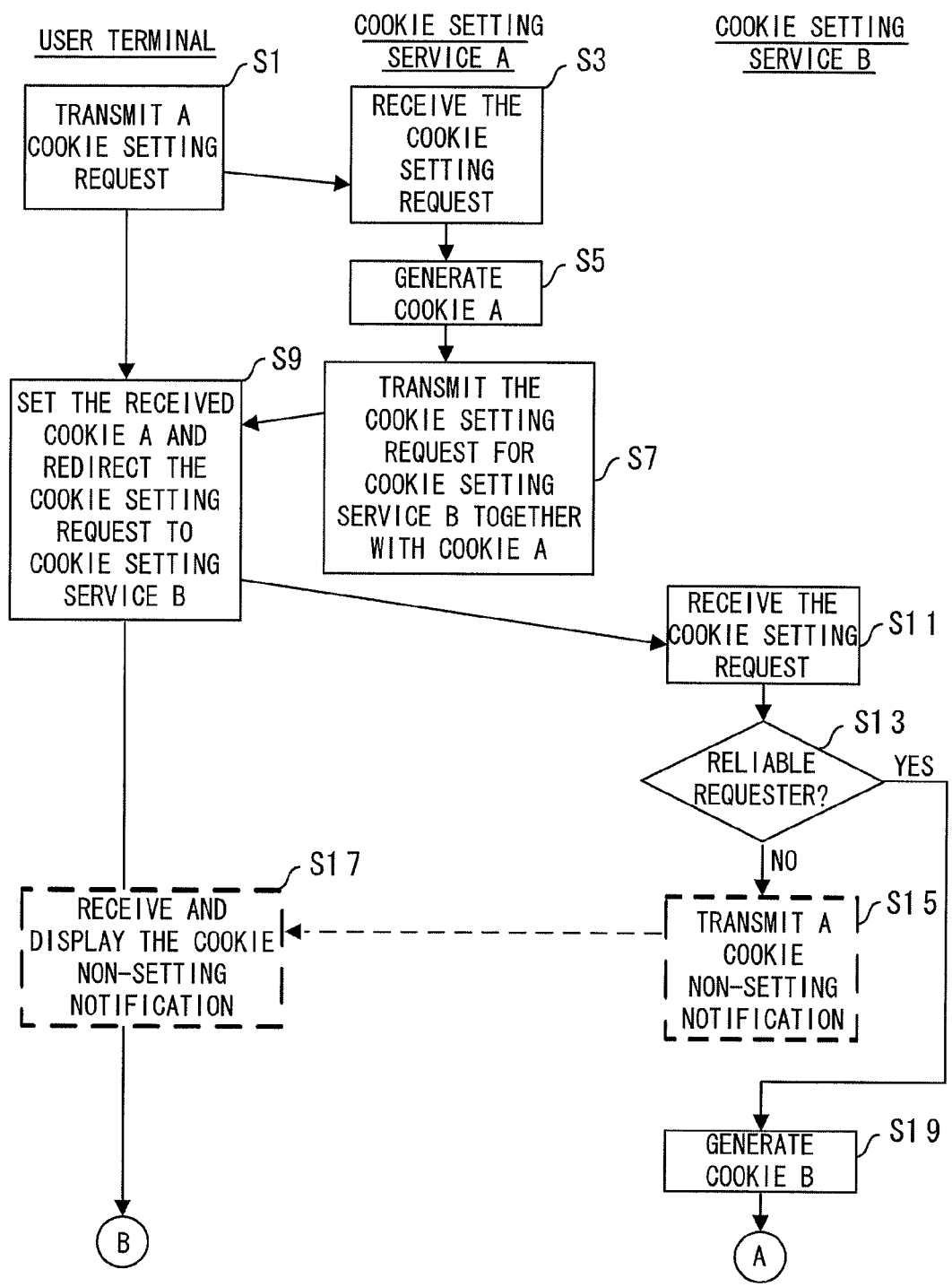
FIG. 6 is a flow chart that shows a first processing flow of a cookie setting process in an embodiment of the present invention.
Figure 7:
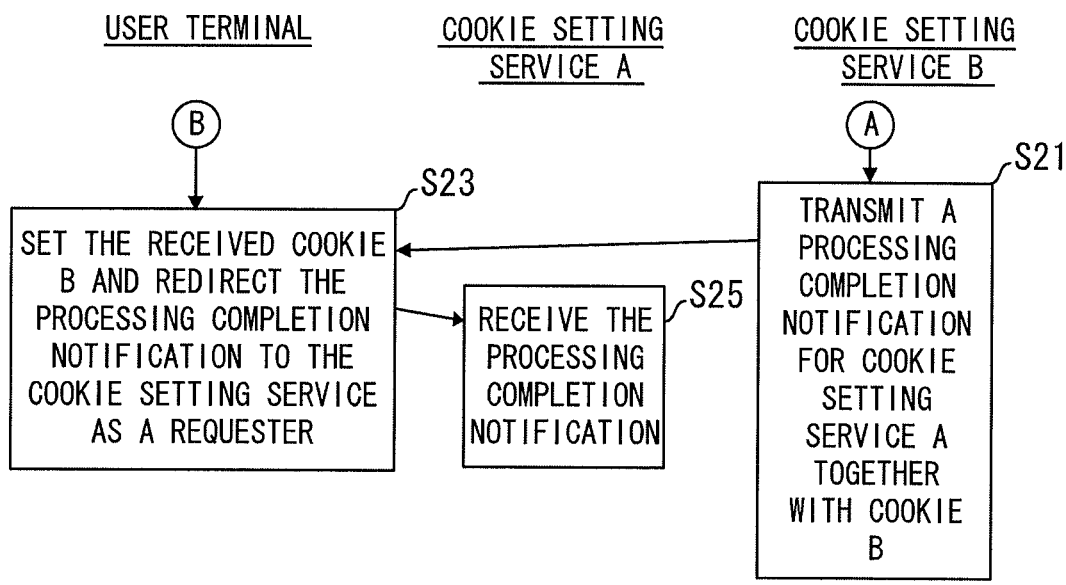
FIG. 7 is a flow chart that shows a second processing flow of the cookie setting process in the embodiment of the present invention.

Processing in the case where a cookie is initialized in a user terminal by the cookie setting service will be described next with reference to FIGS. 6 and 7. First, a user instructs the Web browser 11 of the user terminal to transmit a cookie setting request to Cookie Setting Service A (Step S1). Incidentally, assume a definition that the user must transmit a cookie setting request to Cookie Setting Service A first. Cookie Setting Service A receives the cookie setting request from the user terminal (Step S3), generates Cookie A, and stores Cookie A in a storage device such as a main memory (Step S5). That is, Cookie Setting Service A generates data corresponding to the first line in FIG. 5. "LOCAL" indicating its own system is set as a cookie value, and a range https://auth.a.com/sys including Cookie Setting Service A and Authentication Server A is set as a cookie notification range.

Cookie Setting Service A transmits Cookie A to be set in the user terminal and a cookie setting request message to be redirected to Cookie Setting Service B, to the user terminal (Step S7). While the Web browser 11 of the user terminal receives Cookie A from Cookie Setting Service A and sets the Cookie A, the Web browser 11 redirects the cookie setting request message received from Cookie Setting Service A to Cookie Setting Service B (Step S9). Cookie Setting Service B receives the cookie setting request issued by Cookie Setting Service A from the user terminal (Step S11) and refers to Reliance List B to judge whether Cookie Setting Service A as a sender of the cookie setting request is a reliable requester or not (Step S13). If the sender of the cookie setting request is not registered in Reliance List B (Step S13: No route), Cookie Setting Service B transmits a cookie non-setting notification to the user terminal (Step S15). Incidentally, setting may be made so that the cookie non-setting notification is redirected to the sender of the cookie setting request. The Web browser 11 of the user terminal receives the cookie non-setting notification from Cookie Setting Service B and displays the cookie non-setting notification on a display device (Step S17).

On the other hand, when the sender of the cookie setting request is registered in Reliance List B (Step S13: Yes route), Cookie Setting Service B generates Cookie B and stores Cookie B in a storage device such as a main memory (Step S19). That is, Cookie Setting Service B generates data corresponding to the second line in FIG. 5. "sysA" indicating the sender system of the cookie setting request is set as a cookie value, and a range https://auth.b.com/sys including Cookie Setting Service B and Authentication Server B is set as a cookie notification range. Processing shifts to processing of FIG. 7 through terminals A and B.

Processing of FIG. 7 will be described next. Cookie Setting Service B transmits Cookie B to be set in the user terminal and a processing completion notification message to be redirected to Cookie Setting Service A, to the user terminal (Step S21). While the user terminal receives Cookie B from Cookie Setting Service B and sets the Cookie B, the user terminal redirects the processing completion notification message received from Cookie Setting Service B to Cookie Setting Service A (Step S23). Cookie Setting Service A receives the processing completion notification message from the user terminal (Step S25). If Systems A and B are only connected with each other, processing may be terminated after the completion notification is transmitted to the user terminal. On the other hand, if there is System C or the like to be connected in addition to Systems A and B, Cookie Setting Service A returns to Step S7 and transmits a cookie setting request without Cookie A for Cookie Setting Service C to the user terminal. The same processing can apply to Cookie Setting Service C. If there is further System D or the like, the same processing may be repeated.

When the aforementioned processing is performed, a premise for connection of Systems A and B is accomplished. Although description has been made that setting of Cookie A is performed in Steps S5 to S9, the setting may be performed after cookie setting with respect to the other cookie setting service. That is, the setting of Cookie A may be performed after Step S25.

Figure 8:
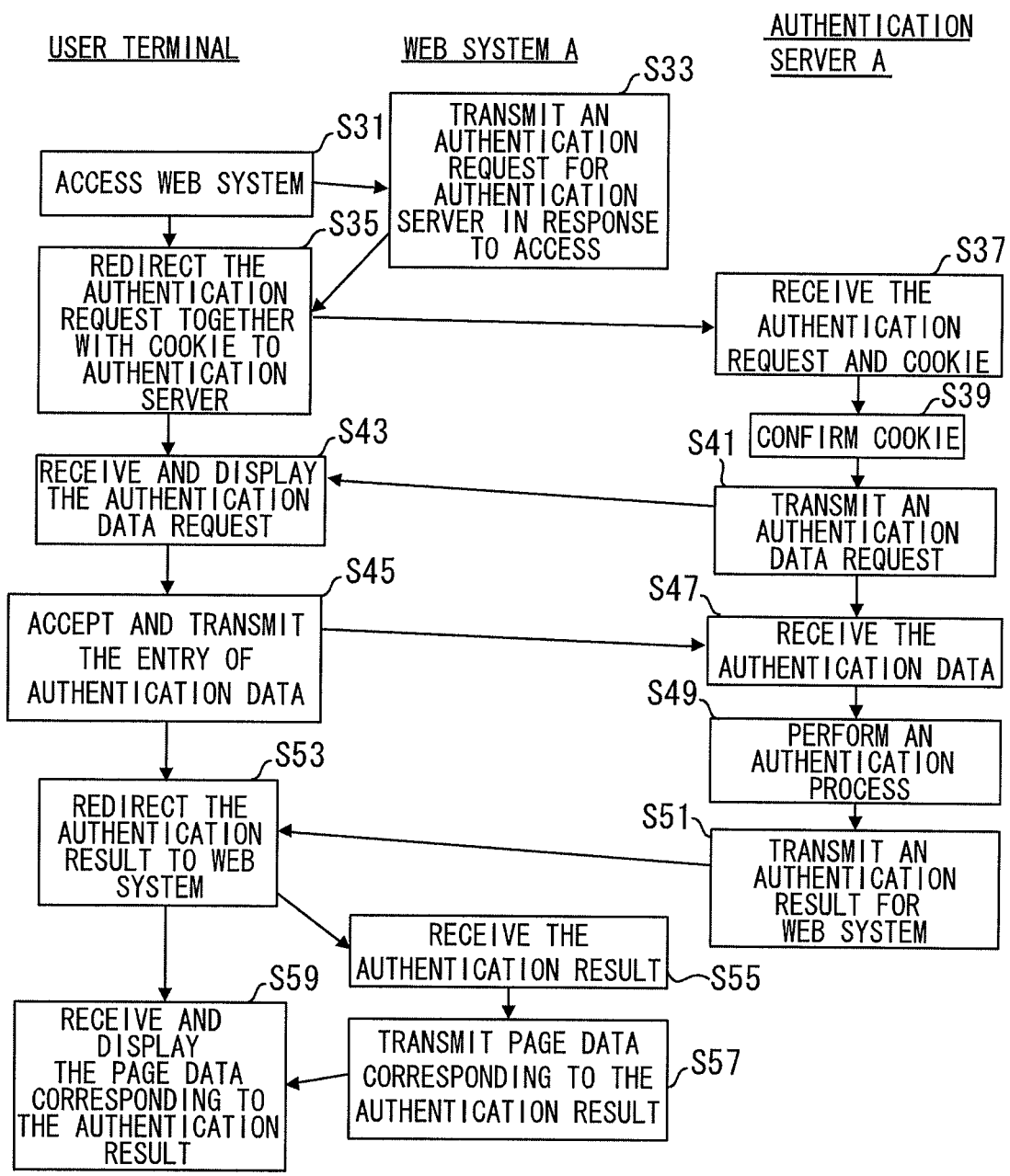
FIG. 8 is a flow chart that shows a first processing flow in Embodiment 1 of the present invention.

Processing performed under the aforementioned premise will be described next with reference to FIGS. 8 to 16. Referring first to FIG. 8, processing in the case where the user terminal accesses Web System A of System A will be described. First, the Web browser 11 of the user terminal accesses Web System A in response to a user instruction (Step S31). In response to access from the user terminal, Web System A then transmits an authentication request message to be redirected to Authentication Server A, to the user terminal (Step S33). Upon reception of the authentication request message for Authentication Server A from Web System A, the Web browser 11 of the user terminal redirects the authentication request message together with Cookie A to Authentication Server A (Step S35). Because Authentication Server A is included in the notification range of Cookie A, Cookie A is also transmitted when redirection is performed. Authentication Server A receives the authentication request message and Cookie A from the user terminal (Step S37) and confirms the content of the cookie (Step S39). A judgment is now made as to whether Cookie A indicates that the user of the user terminal should be authenticated by Authentication Server A.

When Cookie A indicates that the user of the user terminal should be authenticated by Authentication Server A, Authentication Server A transmits an authentication data request message to the user terminal (Step S41). The Web browser 11 of the user terminal receives the authentication data request message from Authentication Server A and displays the authentication data request message on a display device (Step S43). For example, the user enters an ID and a password as authentication data in ID and password entry fields displayed on the display device. The Web browser 11 of the user terminal accepts the entry of authentication data from the user and transmits the authentication data to Authentication Server A (Step S45). Authentication Server A receives the authentication data from the user terminal (Step S47) and stores the authentication data in a storage device such as a main memory. Authentication Server A then performs an authentication process (Step S49) and transmits an authentication result to be redirected to Web System A, to the user terminal (Step S51). Upon reception of the authentication result for Web System A from Authentication Server A, the Web browser 11 of the user terminal redirects the authentication result to Web System A (Step S53). Web System A receives the authentication result issued by Authentication Server A from the user terminal (Step S55), generates page data corresponding to the authentication result and sends the page data corresponding to the authentication result back to the user terminal (Step S57). The Web browser 11 of the user terminal receives the page data corresponding to the authentication result from Web System A and displays the page data corresponding to the authentication result on a display device (Step S59). After that, an ordinary process advances. Incidentally, when the authentication result indicates a success of authentication, the authentication result may be held as another cookie in the Web browser 11 of the user terminal.

As described above, authentication is performed, so that the user can receive service from Web Server A.

Figure 9:
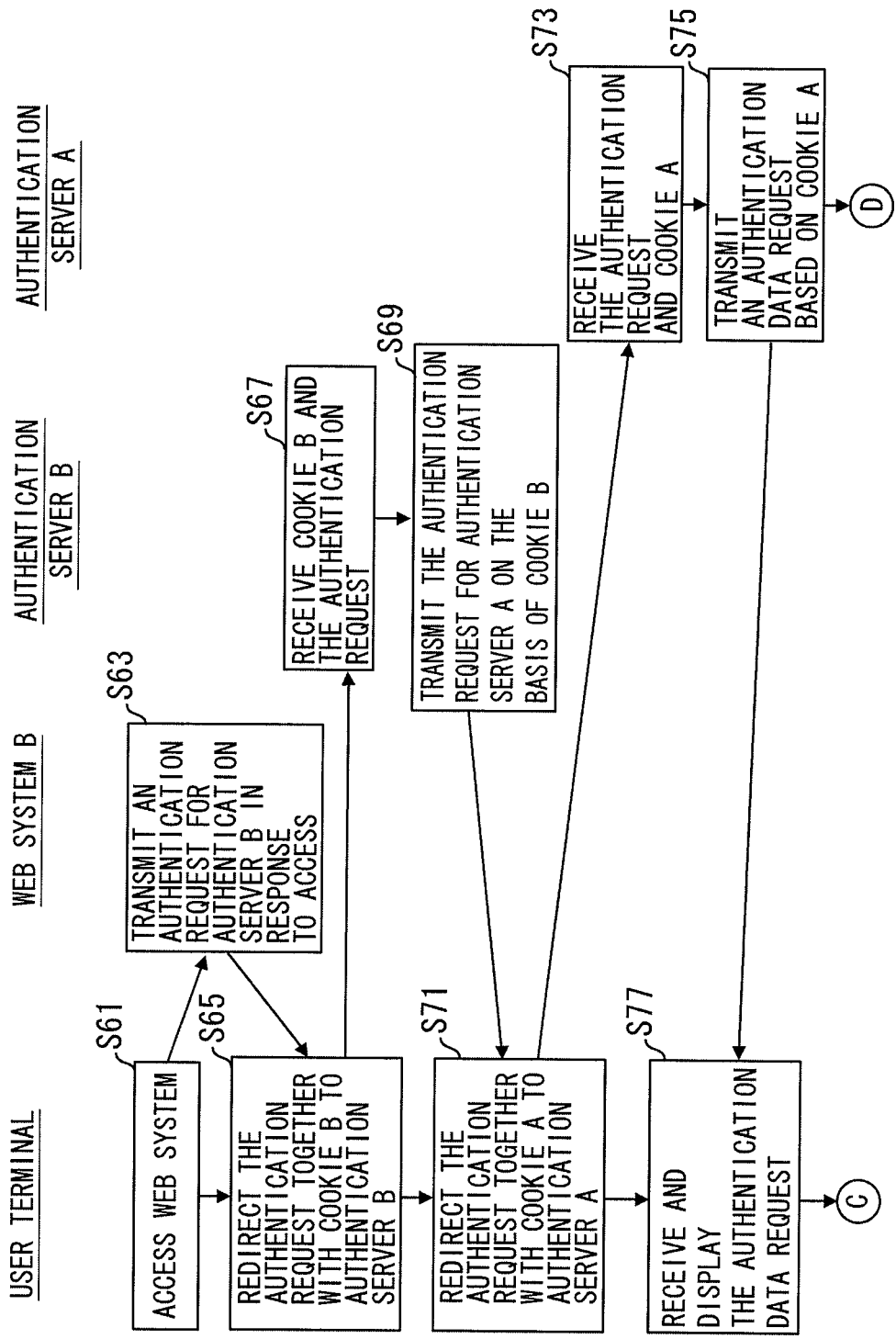
FIG. 9 is a flow chart that shows a second processing flow in Embodiment 1 of the present invention.
Figure 10:
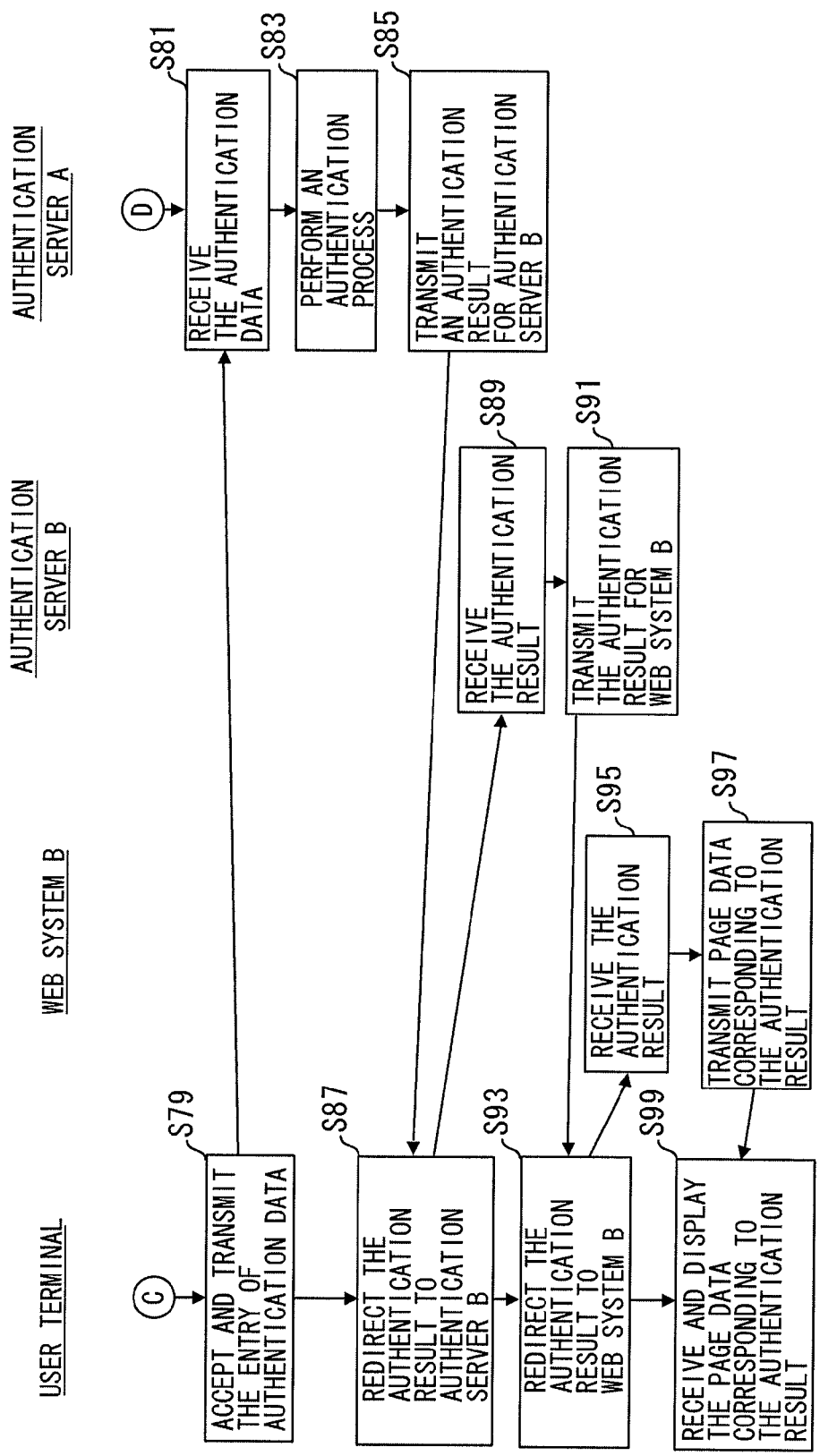
FIG. 10 is a flow chart that shows a third processing flow in Embodiment 1 of the present invention.
Figure 11:
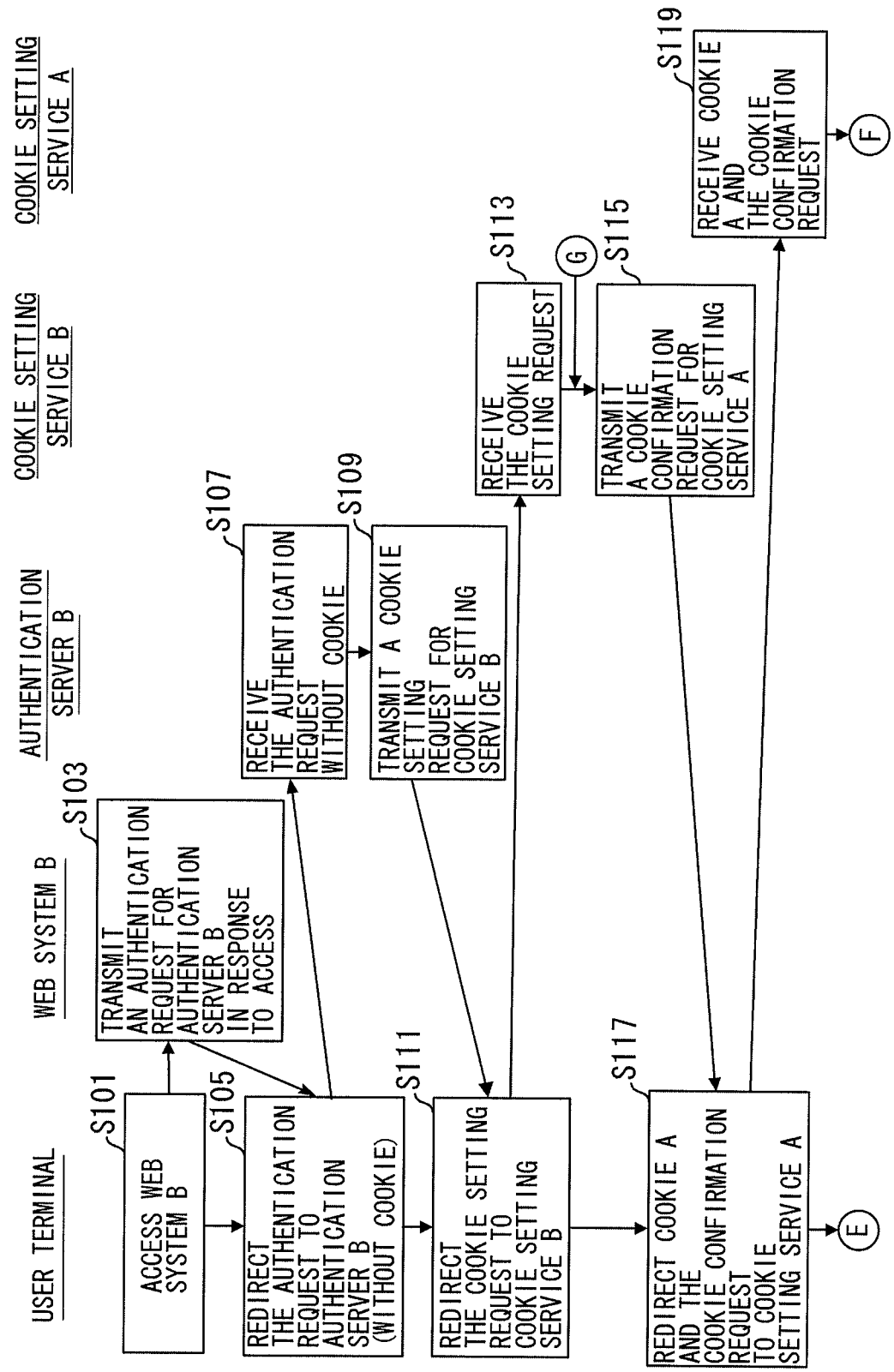
FIG. 11 is a flow chart that shows a fourth processing flow in Embodiment 1 of the present invention.

Processing in the case where the user terminal accesses Web System B will be described next with reference to FIGS. 9 and 10. First, the Web browser 11 of the user terminal accesses Web System B in response to a user instruction (Step S61). In response to access from the user terminal, Web System B then transmits an authentication request message to be redirected to Authentication Server B, to the user terminal (Step S63). Upon reception of the authentication request message for Authentication Server B from Web System B, the Web browser 11 of the user terminal redirects the authentication request message together with Cookie B to Authentication Server B (Step S65). Because Authentication Server B is included in the notification range of Cookie B, Cookie B is also transmitted when redirection is performed. Authentication Server B receives the authentication request message and Cookie B from the user terminal (Step S67) and confirms the content of the cookie. When notification of a cookie like the second line in FIG. 5 is given, Cookie B indicates that the user of the user terminal should be authenticated by Authentication Server A. The URL of Authentication Server A can be specified by referring to Connection List B.

Authentication Server B then transmits the authentication request message to be redirected to Authentication Server A, to the user terminal on the basis of the content of Cookie B (Step S69). Upon reception of the authentication request message for Authentication Server A from Web System B, the Web browser 11 of the user terminal redirects the authentication request message together with Cookie A to Authentication Server A (Step S71). Because Authentication Server A is included in the notification range of Cookie A, Cookie A is also transmitted when redirection is performed. Authentication Server A receives the authentication request message and Cookie A from the user terminal (Step S73) and confirms the content of the cookie. A judgment is now made as to whether Cookie A indicates that the user of the user terminal should be authenticated by Authentication Server A.

When Cookie A indicates that the user of the user terminal should be authenticated by Authentication Server A, Authentication Server A transmits an authentication data request message to the user terminal (Step S75). The Web browser 11 of the user terminal receives the authentication data request message from Authentication Server A and displays the authentication data request message on a display device (Step S77). Processing shifts to processing of FIG. 10 through terminals C and D.

Processing of FIG. 10 will be described next. For example, the user enters an ID and a password as authentication data in ID and password entry fields displayed on the display device. The Web browser 11 of the user terminal accepts the entry of authentication data from the user and transmits the authentication data to Authentication Server A (Step S79). Authentication Server A receives the authentication data from the user terminal (Step S81) and stores the authentication data in a storage device such as a main memory. Authentication Server A then performs an authentication process (Step S83) and transmits an authentication result to be redirected to Authentication Server B as an authentication requester, to the user terminal (Step S85). Upon reception of the authentication result for Authentication Server B from Authentication Server A, the Web browser 11 of the user terminal redirects the authentication result to Authentication Server B (Step S87). Authentication Server B receives the authentication result issued by Authentication Server A from the user terminal (Step S89) and transmits the authentication result to be redirected to Web System B, to the user terminal (Step S91). The Web browser 11 of the user terminal receives the authentication result for Web System B from Authentication Server B and redirects the authentication result to Web System B (Step S93). Web System B receives the authentication result from the user terminal (Step S95), generates page data corresponding to the authentication result and sends the page data corresponding to the authentication result back to the user terminal (Step S97). The Web browser 11 of the user terminal receives the page data corresponding to the authentication result from Web System B and displays the page data corresponding to the authentication result on the display device (Step S99). After that, an ordinary process advances. Incidentally, when the authentication result indicates a success of authentication, the authentication result may be held as another cookie in the Web browser 11 of the user terminal.

Even when the Web browser 11 of the user terminal tries to access Web System B not in charge of the user as described above, the Web browser 11 of the user terminal can be moved to Authentication Server A and authenticated automatically so that the Web browser 11 of the user terminal can access Web System B by using a result of the authentication.

Processing in the case where Cookie B is lost will be described next with reference to FIGS. 11 to 16. This can happen, for example, because of overflow in number of cookies in the Web browser 11. First, the Web browser 11 of the user terminal accesses Web System B in response to a user instruction (Step S101). In response to access from the user terminal, Web System B then transmits an authentication request message to be redirected to Authentication Server B, to the user terminal (Step S103). Upon reception of the authentication request message for Authentication Server B from Web System B, the Web browser 11 of the user terminal redirects the authentication request message to Authentication Server B (Step S105). Cookie B is also transmitted ordinarily when redirection is performed because Authentication Server B is included in the notification range of Cookie B. However, Cookie B cannot be transmitted now because Cookie B is lost. Authentication Server B receives the authentication request message without Cookie B from the user terminal (Step S107). Although an authentication server in charge of the user can be specified ordinarily by Cookie B, Authentication Server B transmits a cookie setting request message to be redirected to Cookie Setting Service B, to the user terminal because Cookie B is lost (Step S109).

Upon reception of the cookie setting request message for Cookie Setting Service B from Authentication Server B, the Web browser 11 of the user terminal redirects the cookie setting request message to Cookie Setting Service B (Step S111). Upon reception of the cookie setting request message from the user terminal (Step S113), Cookie Setting Service B transmits a cookie confirmation request message to be redirected to Cookie Setting Service A, to the user terminal on the basis of Reliance List B (Step S115). Upon reception of the cookie confirmation request message for Cookie Setting Service A from Cookie Setting Service B, the Web browser 11 of the user terminal redirects Cookie A together with the cookie confirmation request message to Cookie Setting Service A (Step S117). Because Cookie Setting Service A is included in the notification range of Cookie A, Cookie A is transmitted to Cookie Setting Service A in step S117. Cookie Setting Service A receives Cookie A and the cookie confirmation request message issued by Cookie Setting Service B from the user terminal and stores Cookie A and the cookie confirmation request message in a storage device such as a main memory (Step S119). Processing shifts to processing of FIG. 12 through terminals E and F.

Figure 12:
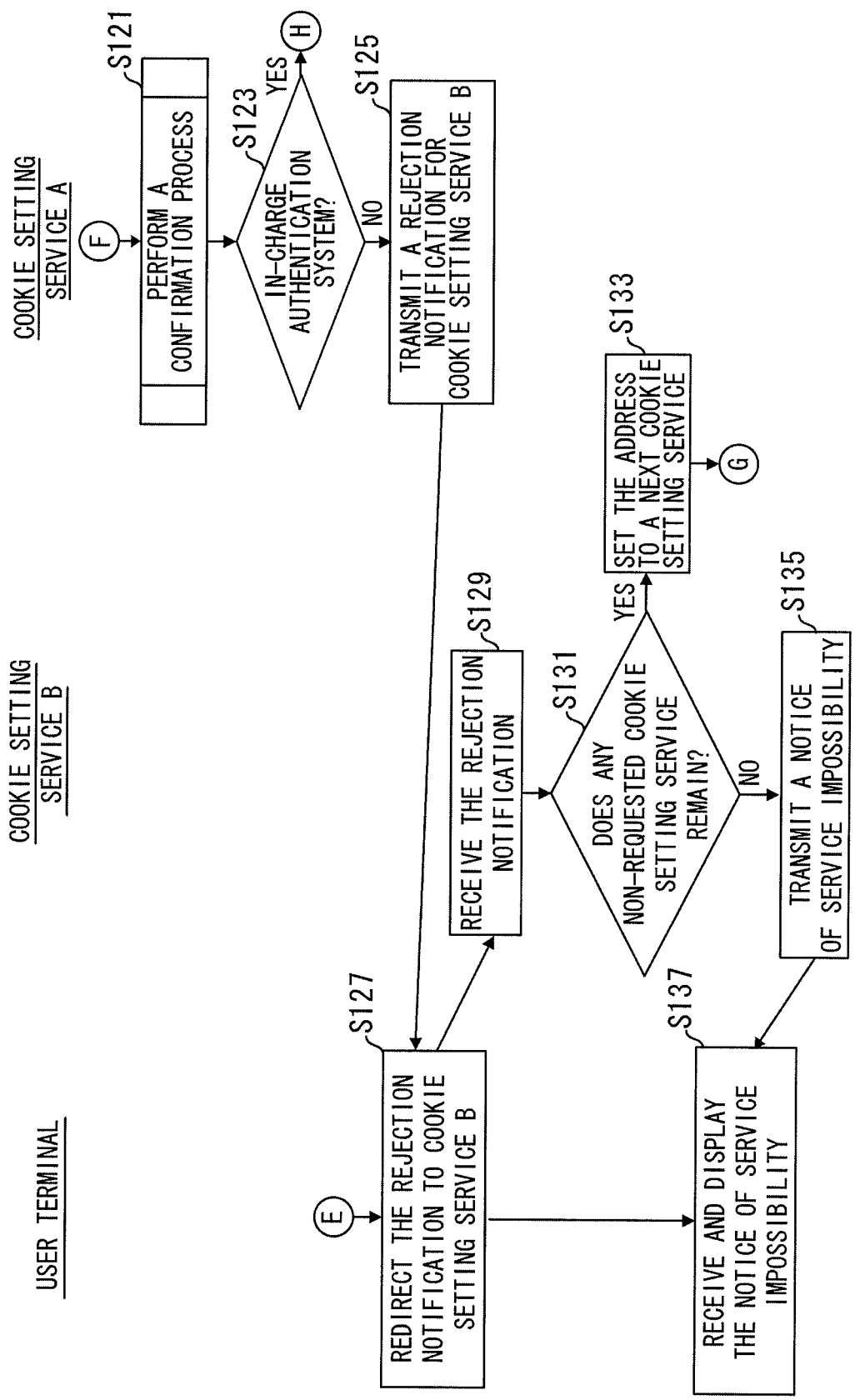
FIG. 12 is a flow chart that shows a fifth processing flow in Embodiment 1 of the present invention.
Figure 13:
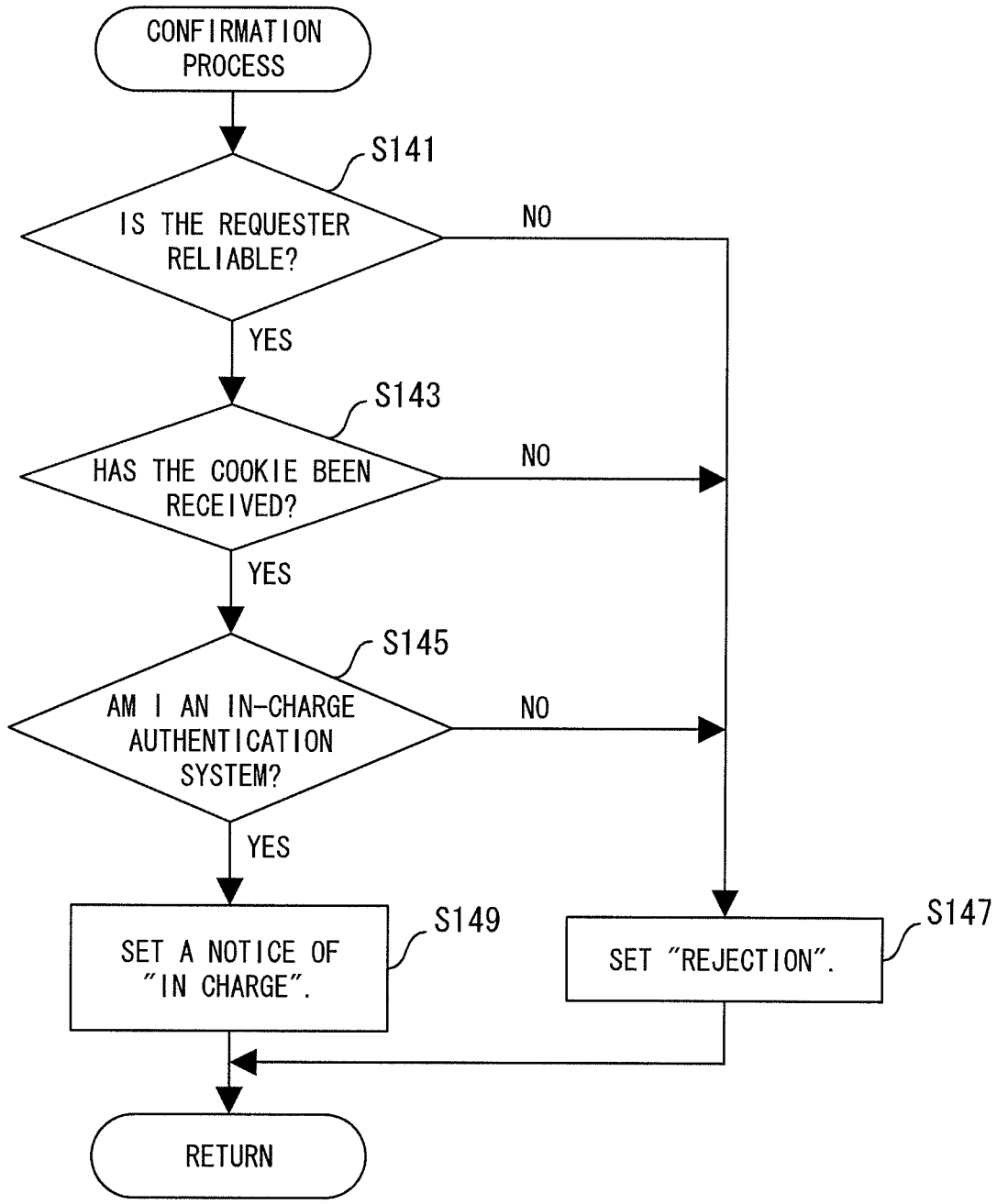
FIG. 13 is a flow chart that shows a processing flow of an authentication process.

Processing of FIG. 12 will be described next. Cookie Setting Service A performs a confirmation process (Step S121). The confirmation process will be described with reference to FIG. 13. Cookie Setting Service A refers to Reliance List A to thereby judge whether Cookie Setting Service B as a requester of the cookie confirmation request is reliable or not (Step S141). If the requester is listed in Reliance List A, a decision is made that the requester is reliable. If the requester is not listed in Reliance List A, a decision is made that the requester is not reliable. When a decision is made that the requester is not reliable, rejection is set (Step S147). On the other hand, when a decision is made that the requester is reliable, a judgment is made as to whether Cookie A has been received in Step S119 (Step S143). When Cookie A has not been received, the situation of this routine goes to Step S147. When Cookie A has been received, Cookie Setting Service A refers to the content of Cookie A to thereby judge whether Cookie Setting Service A is an authentication system in charge (Step S145). That is, a judgment is made as to whether the cookie value is "Local" indicating that System A is an authentication system in charge. When the cookie value is other than "Local", the situation of this routine goes to Step S147. On the other hand, when the cookie indicates that System A is an authentication system in charge, a notice of in charge is set (Step S149). Then, the situation of this routine goes back to the original process.

Referring back to FIG. 12, processing will be described. Cookie Setting Service A makes a judgment based on a result of the confirmation process as to whether Cookie Setting Service A is an authentication system in charge (Step S123). When Step S149 is executed, processing shifts to processing of FIG. 14 through a terminal H because a notice of "in charge" is set. On the other hand, when Step S147 is executed, Cookie Setting Service A transmits a rejection notification message to be redirected to Cookie Setting Service B, to the user terminal because "rejection" is set (Step S125). The Web browser 11 of the user terminal receives the rejection notification message for Cookie Setting Service B from Cookie Setting Service A and redirects the rejection notification message to Cookie Setting Service B (Step S127). Upon reception of the rejection notification message issued by Cookie Setting Service A from the user terminal (Step S129), Cookie Setting Service B judges whether any non-requested cookie setting service remains or not (Step S131).

When any non-requested cookie setting service remains, the address is set to a next non-requested cookie setting service on the basis of Reliance List B (Step S133) and the situation of this routine goes back to Step S115 through a terminal G. For example, when there is Cookie Setting Service C, processing is made so that a cookie confirmation request message is transmitted to Cookie Setting Service C.

On the other hand, when processing does not shift to processing through a terminal H and succeeding terminals in Step S123 though cookie confirmation request messages have been already transmitted to all cookie setting services, a notice of service impossibility is transmitted to the user terminal (Step S135). The Web browser 11 of the user terminal receives the notice of service impossibility from Cookie Setting Service B and displays the notice of service impossibility on the display device (Step S137). On this occasion, for example, processing of FIGS. 6 and 7 is retried.

Figure 14:
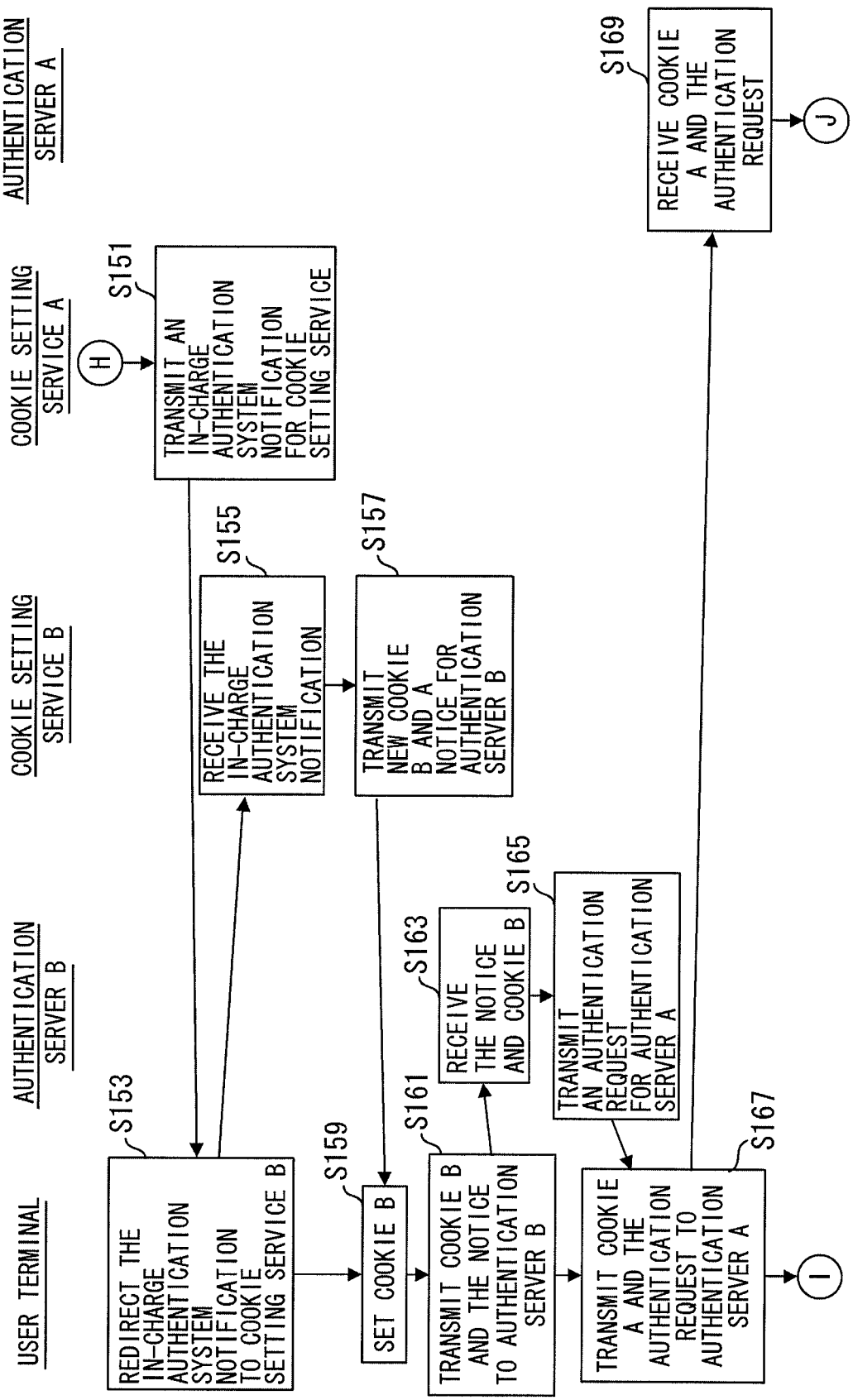
FIG. 14 is a flow chart that shows a sixth processing flow in Embodiment 1 of the present invention.

Processing after the terminal H will be described next with reference to FIG. 14. Cookie Setting Service A transmits an in-charge authentication system notification message to be redirected to Cookie Setting Service B, to the user terminal (Step S151). The in-charge authentication system notification message includes data indicating that System A is in charge of authentication of the user. The Web browser 11 of the user terminal receives the in-charge authentication system notification message for Cookie Setting Service B from Cookie Setting Service A and redirects the in-charge authentication system notification message to Cookie Setting Service B (Step S153). Cookie Setting Service B receives the in-charge authentication system notification message issued by Cookie Setting Service A from the user terminal (Step S155), generates Cookie B again as represented by the second line in FIG. 5 on the basis of the in-charge authentication system notification message and Reliance List B, and transmits the Cookie B and a notification message to be redirected to Authentication Server B, to the user terminal (Step S157). For example, the notification message may include data indicating that Authentication Server A is in charge.

While the Web browser 11 of the user terminal receives Cookie B from Cookie Setting Service B and sets Cookie B (Step S159), the Web browser 11 of the user terminal transmits Cookie B together with the notification message issued by Cookie Setting Service B to Authentication Server B because Authentication Server B is included in the notification range of the set Cookie B (Step S161). Authentication Server B receives Cookie B and the notification message issued by Cookie Setting Service B from the user terminal (Step S163). Authentication Server B then specifies Authentication Server A as an authentication server in charge of the user on the basis of Cookie B (specifies the URL thereof by Connection List B) and transmits an authentication request message to be redirected to Authentication Server A, to the user terminal (Step S165). Upon reception of the authentication request message for Authentication Server A from Authentication Server B, the Web browser 11 of the user terminal transmits the authentication request message and Cookie A including Authentication Server A as a notification range to Authentication Server A (Step S167). Authentication Server A receives the authentication request message issued by Authentication Server B and Cookie A from the user terminal and stores the authentication request message and Cookie A in a storage device such as a main memory (Step S169). Processing shifts to processing of FIG. 15 through terminals I and J.

Figure 15:
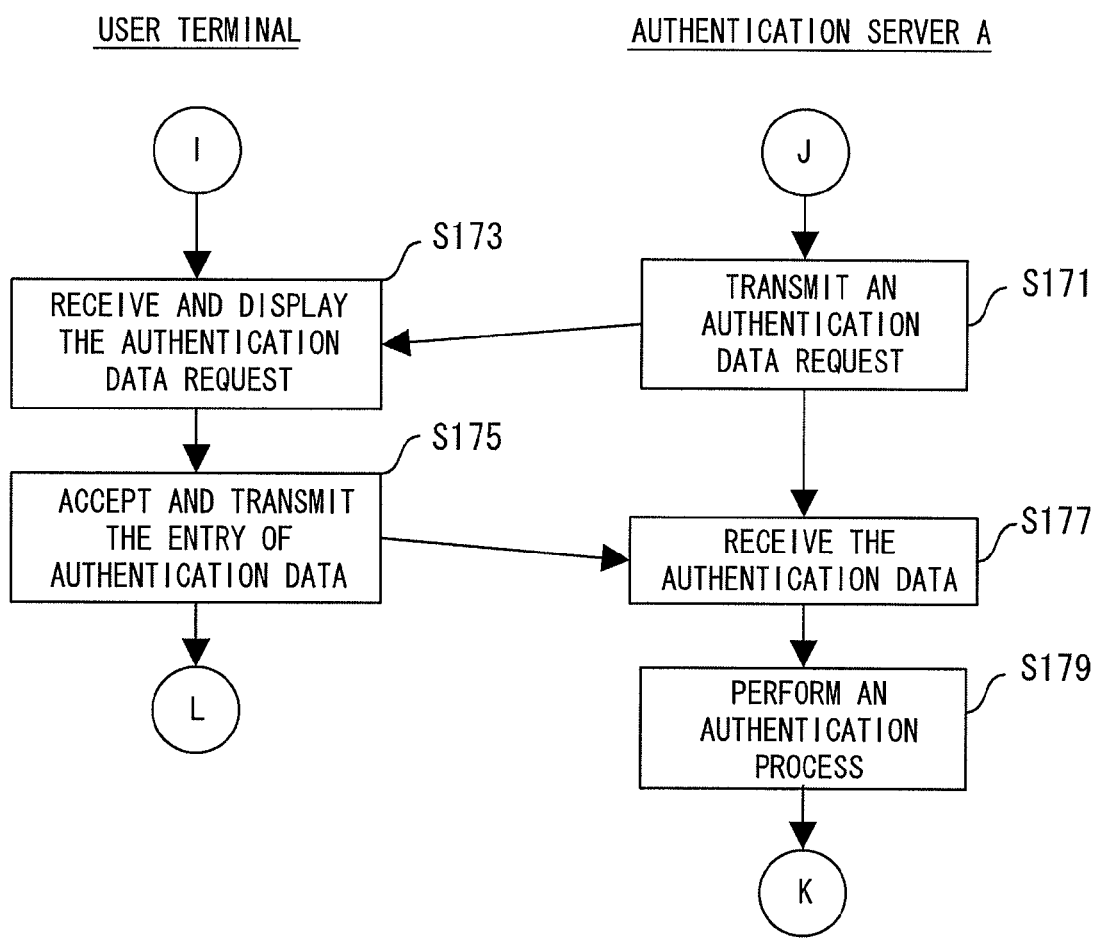
FIG. 15 is a flow chart that shows a seventh processing flow in Embodiment 1 of the present invention.

Processing of FIG. 15 will be described next. Authentication Server A confirms the content of Cookie A. That is, Authentication Server A judges whether Cookie A indicates that the user of the user terminal should be authenticated by Authentication Server A. When Cookie A indicates that the user of the user terminal should be authenticated by Authentication Server A, Authentication Server A transmits an authentication data request message to the user terminal (Step S171). The Web browser 11 of the user terminal receives the authentication data request message from Authentication Server A and displays the authentication data request message on the display device (Step S173).

For example, the user enters an ID and a password as authentication data in ID and password entry fields displayed on the display device. The Web browser 11 of the user terminal accepts the entry of authentication data from the user and transmits the authentication data to Authentication Server A (Step S175). Authentication Server A receives the authentication data from the user terminal (Step S177) and stores the authentication data in a storage device such as a main memory. Then, Authentication Server A performs an authentication process (Step S179). Processing shifts to processing of FIG. 16 through terminals K and L.

Figure 16:
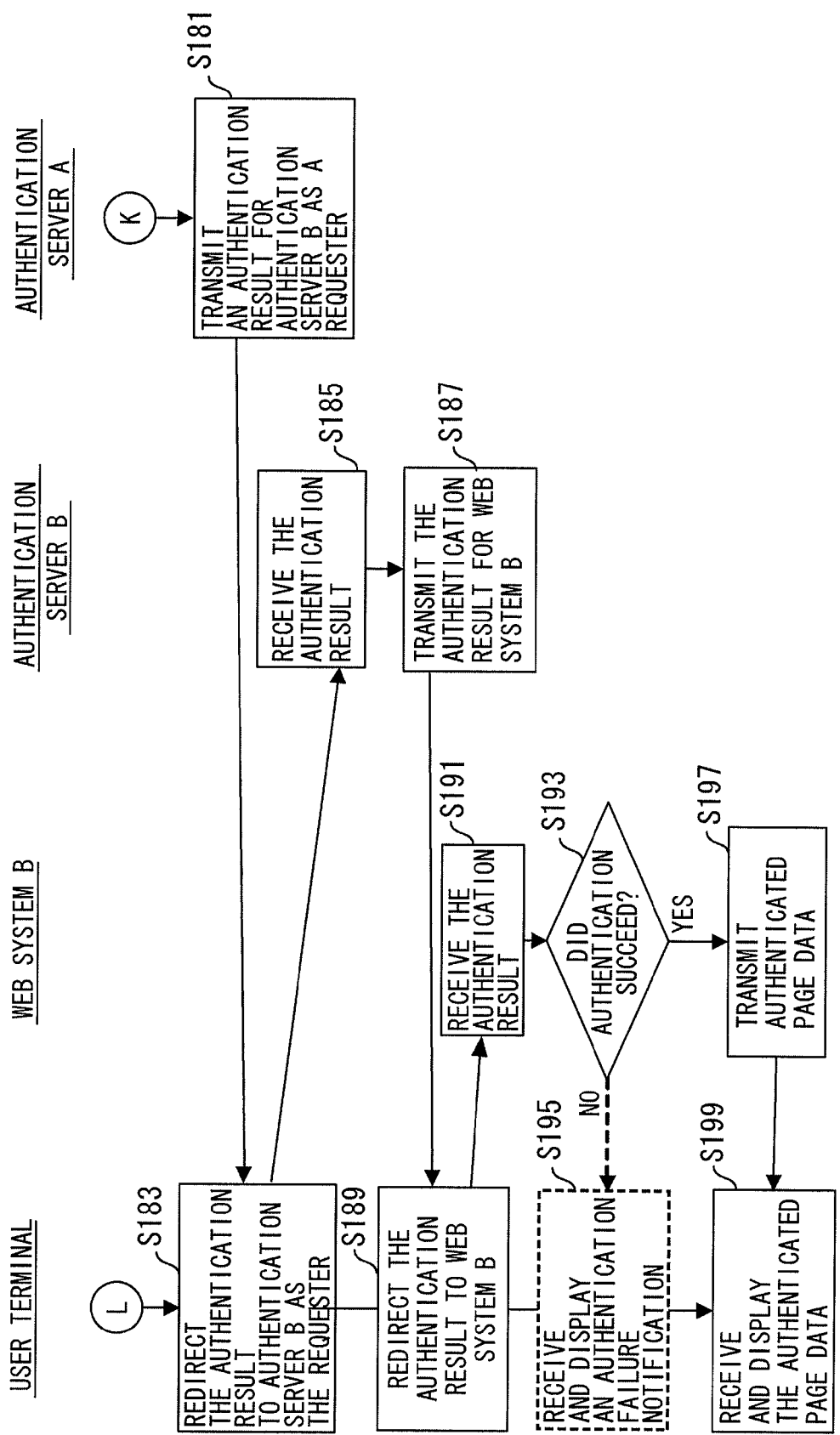
FIG. 16 is a flow chart that shows an eighth processing flow in Embodiment 1 of the present invention.

Processing of FIG. 16 will be described next. Authentication Server A transmits an authentication result to be redirected to Authentication Server B as a requester of the authentication, to the user terminal (Step S181). Upon reception of the authentication result for Authentication Server B from Authentication Server A, the Web browser 11 of the user terminal redirects the authentication result to Authentication Server B (Step S183). Authentication Server B receives the authentication result issued by Authentication Server A from the user terminal (Step S185) and transmits the authentication result to be redirected to Web System B, to the user terminal (Step S187). The Web browser 11 of the user terminal receives the authentication result for Web System B from Authentication Server B and redirects the authentication result to Web System B (Step S189). Web System B receives the authentication result from the user terminal (Step S191) and judges whether the authentication succeeded (Step S193). When the authentication failed, Web System B transmits an authentication failure notification to the user terminal. The Web browser 11 of the user terminal receives the authentication failure notification and displays the authentication failure notification on the display device (Step S195).

On the other hand, when the authentication succeeded, Web System B generates authenticated page data and transmits the authenticated page data to the user terminal (Step S197). The Web browser 11 of the user terminal receives the authenticated page data and displays the authenticated page data on the display device (Step S199).

By performing the aforementioned processing, even when a cookie is lost, a process of compensating for the cookie can be performed. Thus, the authentication process is performed so that the Web system can be used.

Incidentally, Reliance List A and Reliance List B are used so that one cookie setting service specifies or confirms the other cookie setting service or authentication server.

[Embodiment 2]

Figure 17:
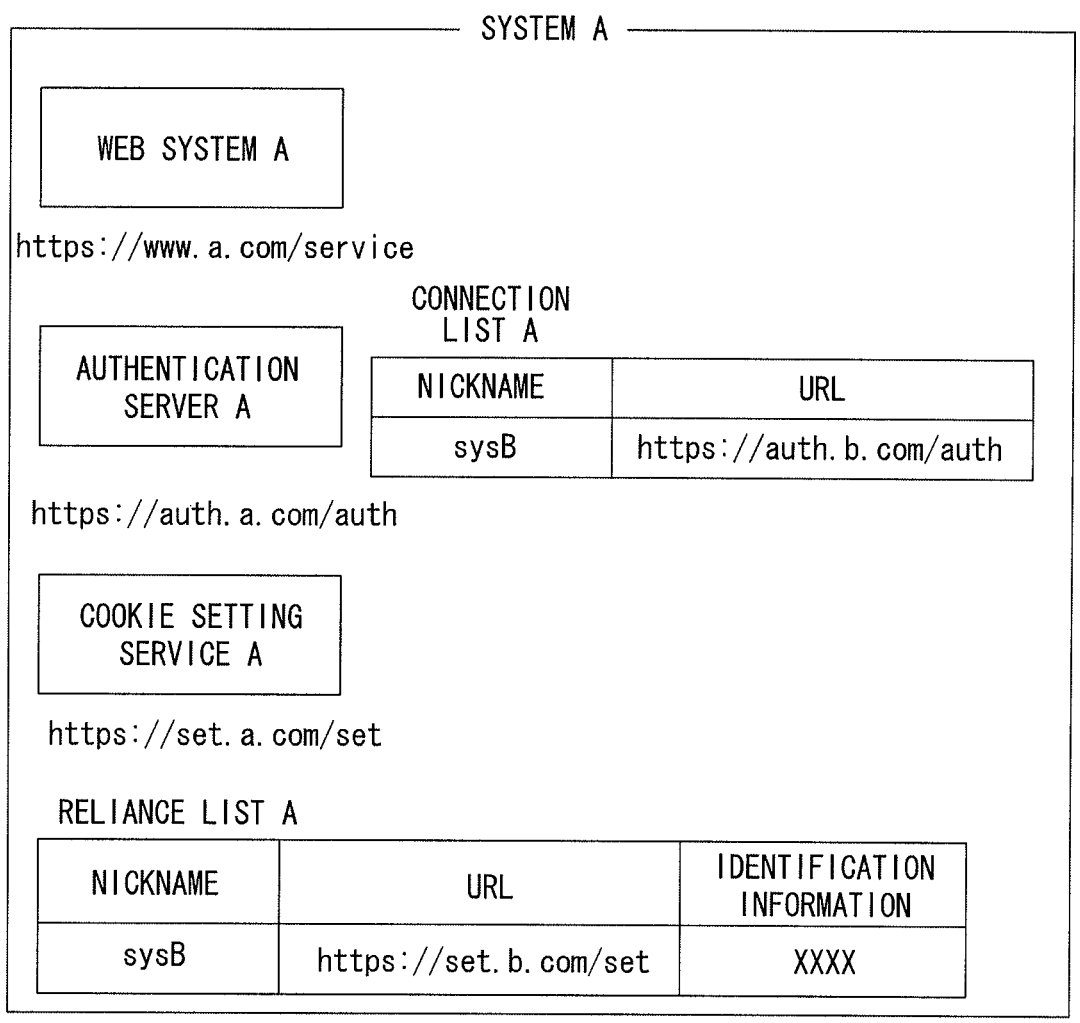
FIG. 17 shows the configuration of System A in Embodiment 2 of the present invention.
Figure 18:
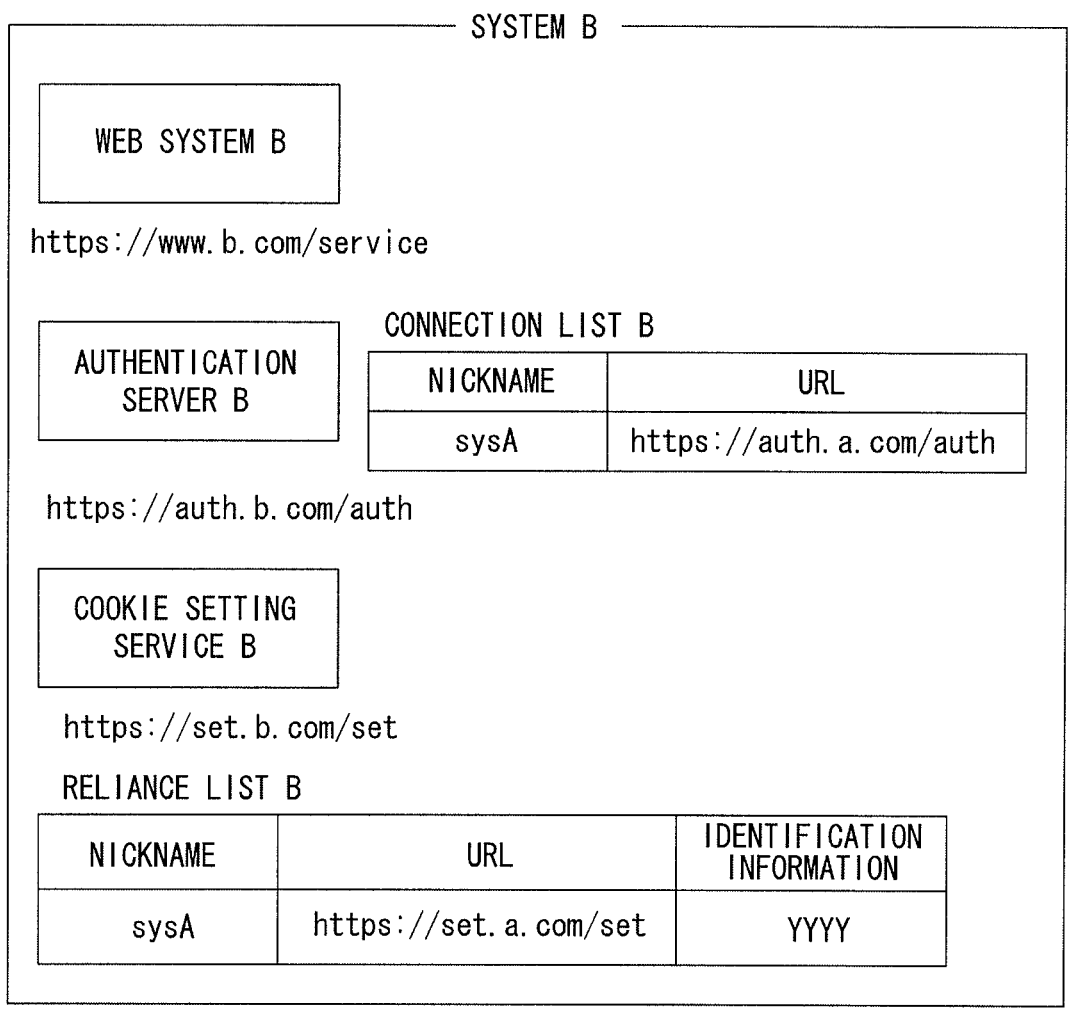
FIG. 18 shows the configuration of System B in Embodiment 2 of the present invention.

FIGS. 17 and 18 show a system configuration in Embodiment 2 of the present invention. First, FIG. 17 shows the configuration of System A in Embodiment 2. In this embodiment, the URL of Web System A is https://www.a.com/service, the URL of Authentication Server A is https://auth.a.com/auth, and the URL of Cookie Setting Service A is https://set.a.com/set. Authentication Server A holds Connection List A in which a nickname sysB and a URL https://auth.b.com/auth are registered. A nickname sysB, a URL https://set.b.com/set and identification information XXXX are registered in Reliance List A.

FIG. 18 shows the configuration of System B in Embodiment 2. In this embodiment, the URL of Web System B is https://www.b.com/service, the URL of Authentication Server B is https://auth.b.com/auth, and the URL of Cookie Setting Service B is https://set.b.com/set. Authentication Server B holds Connection List B in which a nickname sysA and a URL https://auth.a.com/auth are registered. A nickname sysA, a URL https://set.a.com/set and identification information YYYY are registered in Reliance List B.

As described above, there is registration that Authentication Server A is connected with Authentication Server B and Authentication Server B is connected with Authentication Server A. Respective URLs are set for Authentication Server A and Cookie Setting Service A, separately. Similarly, respective URLs are set for Authentication Server B and Cookie Setting Service B, separately. Embodiment 2 is different from Embodiment 1 in this point. Cookie Setting Service B having a URL https://set.b.com/set of System B is registered in Reliance List A, whereas Cookie Setting Service A having a URL https://set.a.com/set of System A is registered in Reliance List B. Embodiment 2 is different from Embodiment 1 also in this point.

FIG. 19 shows an example of cookies registered in a user terminal in Embodiment 2. In the example shown in FIG. 19, Cookie A corresponds to the first line, and Cookie B corresponds to the second line. Cookie A includes a cookie name "AUTHSYSTEM", a cookie value "LOCAL" (nickname indicating a notification range itself), and a cookie notification range https://set.a.com/set. The notification range of Cookie A is only Cookie Setting Service A. Cookie B includes a cookie name "AUTHSYSTEM", a cookie value "sysA" (nickname of System A), and a cookie notification range https://set.b.com/set. The notification range of Cookie B is only Cookie Setting Service B.

Figure 20:
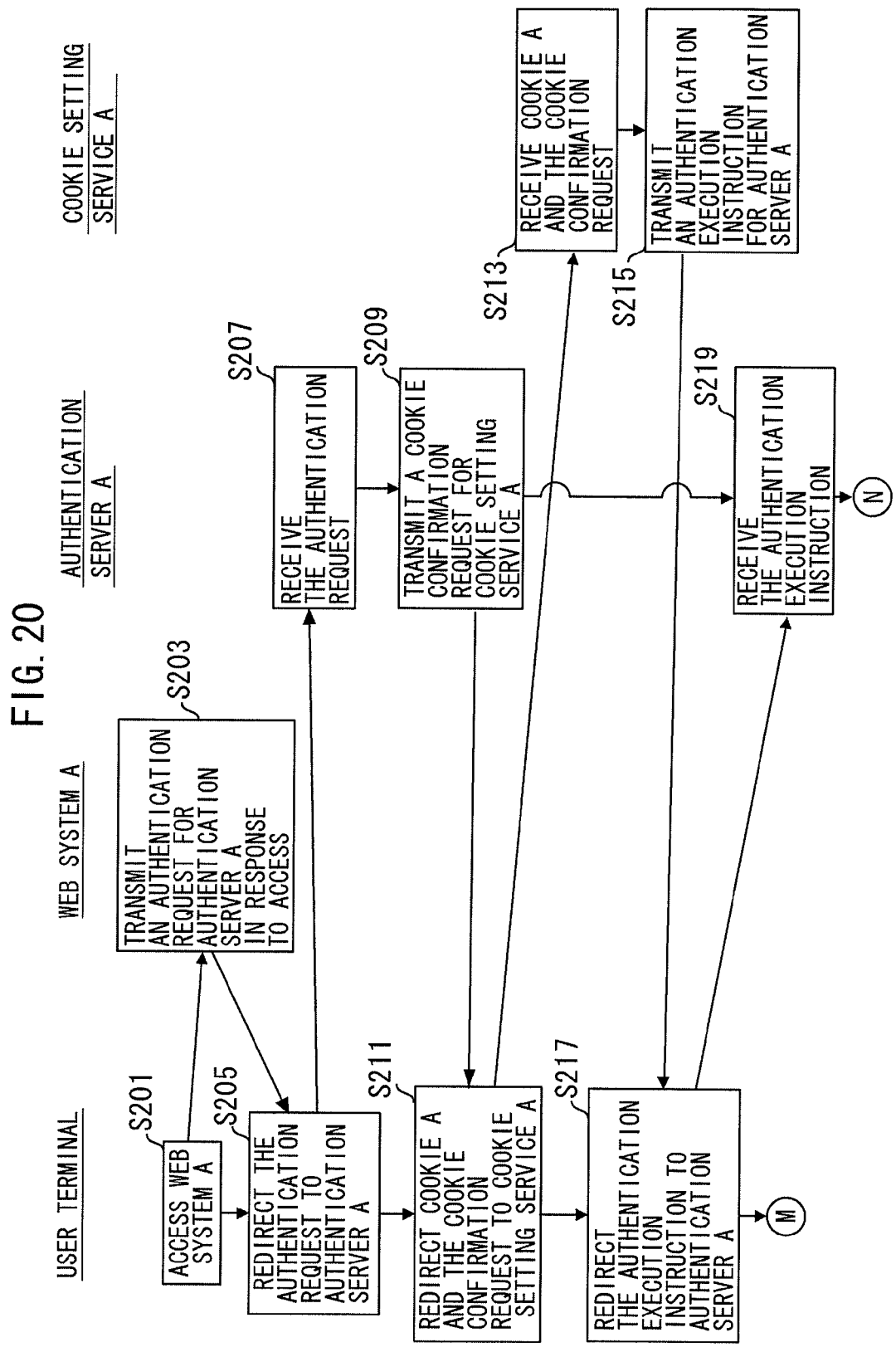
FIG. 20 is a flow chart that shows a first processing flow in Embodiment 2 of the present invention.
Figure 21:
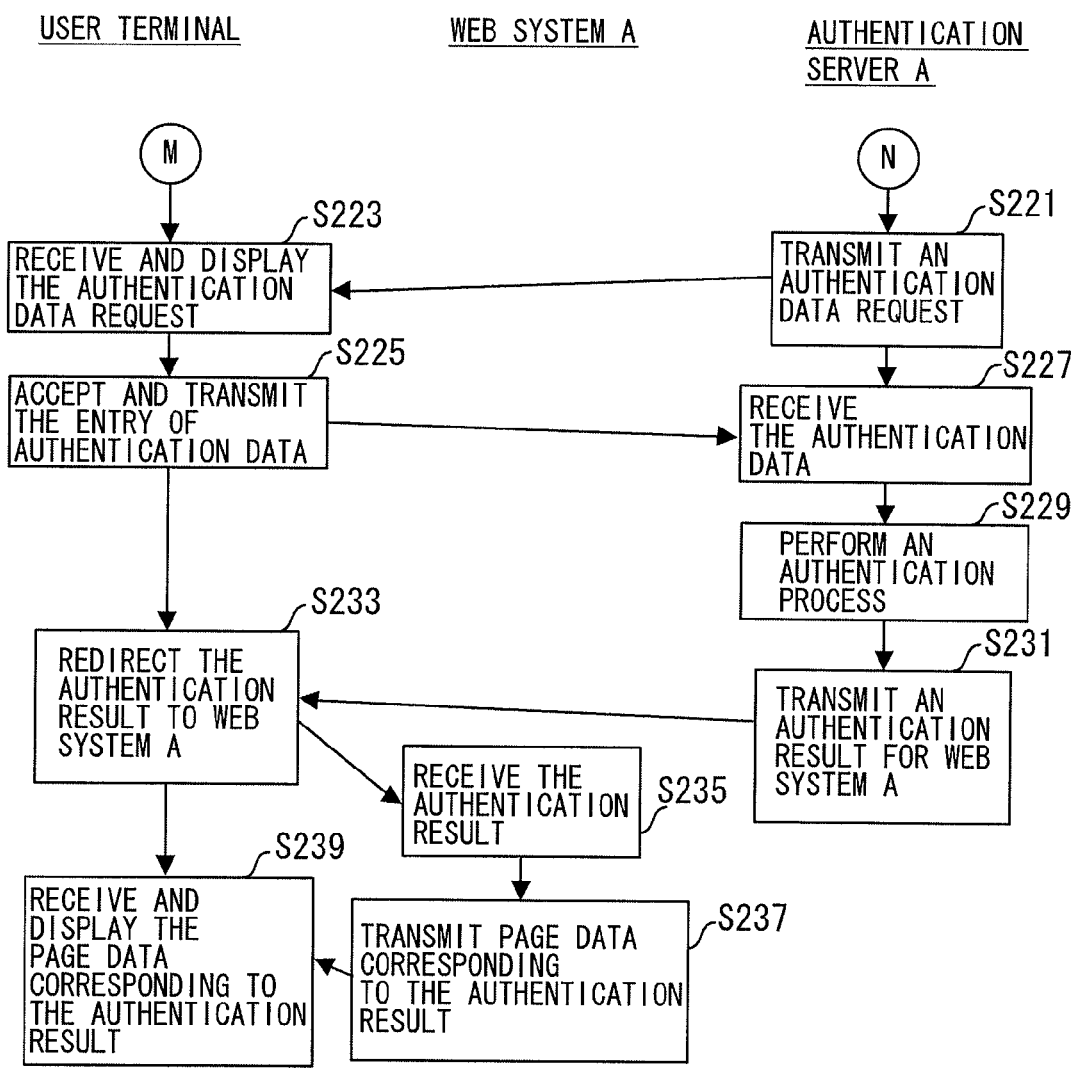
FIG. 21 is a flow chart that shows a second processing flow in Embodiment 2 of the present invention.

Processing performed under the aforementioned premise will be described next with reference to FIGS. 20 to 28. Referring first to FIG. 20, processing in the case where the user terminal accesses Web System A of System A will be described. First, the Web browser 11 of the user terminal accesses Web System A in response to a user instruction (Step S201). In response to access from the user terminal, Web System A then transmits an authentication request message to be redirected to Authentication Server A, to the user terminal (Step S203). Upon reception of the authentication request message for Authentication Server A from Web System A, the Web browser 11 of the user terminal redirects the authentication request message to Authentication Server A (Step S205). Because Authentication Server A is not included in the notification range of Cookie A, Cookie A is not transmitted when redirection is performed in this embodiment. Authentication Server A receives the authentication request message from the user terminal (Step S207) and transmits a cookie confirmation request to be redirected to Cookie Setting Service A, to the user terminal (Step S209). The Web browser 11 of the user terminal receives the cookie confirmation request for Cookie Setting Service A from Authentication Server A and redirects the cookie confirmation request together with Cookie A to Cookie Setting Service A (Step S211). Because Cookie Setting Service A is included in the notification range of Cookie A, Cookie A is transmitted together with the cookie confirmation request.

Cookie Setting Service A receives Cookie A and the cookie confirmation request issued by Authentication Server A from the user terminal (Step S213) and confirms Cookie A to thereby judge whether Authentication Server A should perform an authentication process. Cookie Setting Service A then transmits an authentication execution instruction to be redirected to Authentication Server A, to the user terminal on the basis of the Cookie A (Step S215).

The Web browser 11 of the user terminal receives the authentication execution instruction for Authentication Server A from Cookie Setting Service A and redirects the authentication execution instruction to Authentication Server A (Step S217). Authentication Server A receives the authentication execution instruction issued by Cookie Setting Service A from the user terminal (Step S219). Processing shifts to processing of FIG. 21 through terminals M and N.

Authentication Server A transmits an authentication data request message to the user terminal (Step S221). The Web browser 11 of the user terminal receives the authentication data request message from Authentication Server A and displays the authentication data request message on the display device (Step S223). For example, the user enters an ID and a password as authentication data in ID and password entry fields displayed on the display device. The Web browser 11 of the user terminal accepts the entry of authentication data from the user and transmits the authentication data to Authentication Server A (Step S225). Authentication Server A receives the authentication data from the user terminal (Step S227) and stores the authentication data in a storage device such as a main memory. Authentication Server A then performs an authentication process (Step S229) and transmits an authentication result to be redirected to Web System A, to the user terminal (Step S231). Upon reception of the authentication result for Web System A from Authentication Server A, the Web browser 11 of the user terminal redirects the authentication result to Web System A (Step S233). Web System A receives the authentication result issued by Authentication Server A from the user terminal (Step S235), generates page data corresponding to the authentication result and sends the page data corresponding to the authentication result back to the user terminal (Step S237). The Web browser 11 of the user terminal receives the page data corresponding to the authentication result from Web System A and displays the page data corresponding to the authentication result on the display device (Step S239). After that, an ordinary process advances. Incidentally, when the authentication result indicates a success of authentication, the authentication result may be held as another cookie in the Web browser 11 of the user terminal.

As described above, authentication is performed, so that the user can receive service from Web Server A.

Figure 22:
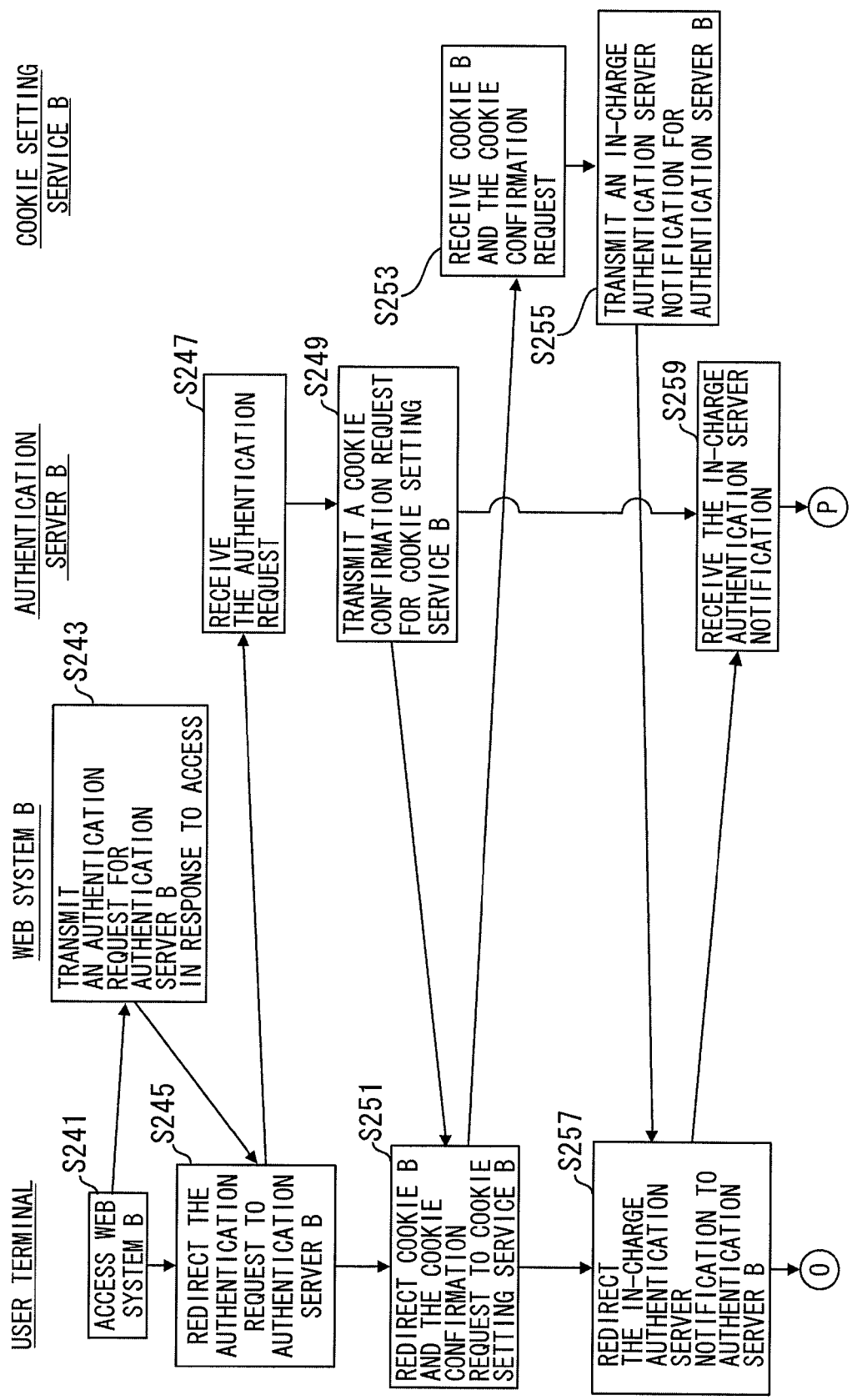
FIG. 22 is a flow chart that shows a third processing flow in Embodiment 2 of the present invention.

Processing in the case where the user terminal accesses Web System B will be described next with reference to FIGS. 22 to 24. First, the Web browser 11 of the user terminal accesses Web System B in response to a user instruction (Step S241). In response to access from the user terminal, Web System B then transmits an authentication request message to be redirected to Authentication Server B, to the user terminal (Step S243). Upon reception of the authentication request message for Authentication Server B from Web System B, the Web browser 11 of the user terminal redirects the authentication request message to Authentication Server B (Step S245). Because Authentication Server B is not included in the notification range of Cookie B, Cookie B is not transmitted when redirection is performed. Authentication Server B receives the authentication request message from the user terminal (Step S247). Authentication Server B then transmits a cookie confirmation request message to be redirected to Cookie Setting Service B, to the user terminal (Step S249). The Web browser 11 of the user terminal receives the cookie confirmation request for Cookie Setting Service B from Authentication Server B and redirects Cookie B together with the cookie confirmation request to Cookie Setting Service B (Step S251). Cookie Setting Service B receives Cookie B and the cookie confirmation request issued by Authentication Server B from the user terminal (Step S253) and confirms the received Cookie B.

When notification of Cookie B like the second line in FIG. 19 is given, it is understood that Cookie B indicates that the user of the user terminal should be authenticated by Authentication Server A. The URL of Authentication Server A can be specified by referring to Connection List B.

Cookie Setting Service B then transmits an in-charge authentication server notification message (message indicating that Authentication Server A is an in-charge authentication server) to be redirected to Authentication Server B, to the user terminal (Step S255). The Web browser 11 of the user terminal receives the in-charge authentication server notification message for Authentication Server B from Cookie Setting Service B and redirects the in-charge authentication server notification message to Authentication Server B (Step S257). Authentication Server B receives the in-charge authentication server notification message issued by Cookie Setting Service B from the user terminal (Step S259). By the in-charge authentication server notification message, Authentication Server B can recognize that an authentication request should be transmitted to Authentication Server A. Processing shifts to processing of FIG. 23 through terminals O and P.

Authentication Server B then transmits an authentication request message to be redirected to Authentication Server A, to the user terminal (Step S261). Upon reception of the authentication request message for Authentication Server A from Authentication Server B, the Web browser 11 of the user terminal redirects the authentication request message to Authentication Server A (Step S263). Authentication Server A receives the authentication request message from the user terminal (Step S265). When Authentication Server A receives the authentication request message, Authentication Server A judges that the authentication server is a reliable authentication server, for example, on the basis of Reliance List A and transmits an authentication data request message to the user terminal (Step S267). Incidentally, as will be described later, a process that the presence of Cookie A is confirmed by Cookie Setting Service A may be put in between Steps S265 and S267. The Web browser 11 of the user terminal receives the authentication data request message from Authentication Server A and displays the authentication data request message on the display device (Step S269).

For example, the user enters an ID and a password as authentication data in ID and password entry fields displayed on the display device. The Web browser 11 of the user terminal accepts the entry of authentication data from the user and transmits the authentication data to Authentication Server A (Step S271). Authentication Server A receives the authentication data from the user terminal (Step S273) and stores the authentication data in a storage device such as a main memory. Authentication Server A then performs an authentication process (Step S275). Processing shifts to processing of FIG. 24 through terminals Q and R.

Authentication Server A transmits an authentication result to be redirected to Authentication Server B as an authentication requester, to the user terminal (Step S277). Upon reception of the authentication result for Authentication Server B from Authentication Server A, the Web browser 11 of the user terminal redirects the authentication result to Authentication Server B (Step S279). Authentication Server B receives the authentication result issued by Authentication Server A from the user terminal (Step S281) and transmits the authentication result to be redirected to Web System B, to the user terminal (Step S283). The Web browser 11 of the user terminal receives the authentication result for Web System B from Authentication Server B and redirects the authentication result to Web System B (Step S285). Web System B receives the authentication result from the user terminal (Step S287), generates page data corresponding to the authentication result, and sends the page data corresponding to the authentication result back to the user terminal (Step S289). The Web browser 11 of the user terminal receives the page data corresponding to the authentication result from Web System B and displays the page data corresponding to the authentication result on the display device (Step S291). After that, an ordinary process advances. Incidentally, when the authentication result indicates a success of authentication, the authentication result may be held as another cookie in the Web browser 11 of the user terminal.

Even when the Web browser 11 of the user terminal tries to access Web System B not in charge of the user as described above, the Web browser 11 of the user terminal can be moved to Authentication Server A and authenticated automatically so that the Web browser 11 of the user terminal can access Web System B by using a result of the authentication.

Processing in the case where Cookie B is lost will be described next with reference to FIGS. 5 to 28. This can happen, for example, because of overflow in number of cookies in the Web browser 11. First, the Web browser 11 of the user terminal accesses Web System B in response to a user instruction (Step S301). In response to access from the user terminal, Web System B then transmits an authentication request message to be redirected to Authentication Server B, to the user terminal (Step S303). Upon reception of the authentication request message for Authentication Server B from Web System B, the Web browser 11 of the user terminal redirects the authentication request message to Authentication Server B (Step S305). Authentication Server B receives the authentication request message from the user terminal and transmits a cookie confirmation request to be redirected to Cookie Setting Service B, to the user terminal (Step S307). The Web browser 11 of the user terminal receives the cookie confirmation request for Cookie Setting Service B from Authentication Server B and redirects the cookie confirmation request without Cookie B to Cookie Setting Service B (Step S309). Cookie B is also transmitted ordinarily when redirection is performed because Cookie Setting Service B is included in the notification range of Cookie B. However, Cookie B cannot be transmitted now because Cookie B is lost. Cookie Setting Service B receives the cookie confirmation request issued by Authentication Server B from the user terminal (Step S311). Although an in-charge authentication server can be specified ordinarily by Cookie B, Cookie Setting Service B transmits the cookie confirmation request message to be redirected to Cookie Setting Service A, to the user terminal because Cookie B is lost (Step S313).

Upon reception of the cookie confirmation request message for Cookie Setting Service A from Cookie Setting Service B, the Web browser 11 of the user terminal redirects the cookie confirmation request message together with Cookie A to Cookie Setting Service A (Step S315). Because Cookie Setting Service A is included in the notification range of Cookie A, the cookie confirmation request message together with Cookie A are transmitted in Step S315. Cookie Setting Service A receives the cookie confirmation request from the user terminal (Step S317). Processing shifts to processing of FIG. 26 through a terminal S.

Figure 26:
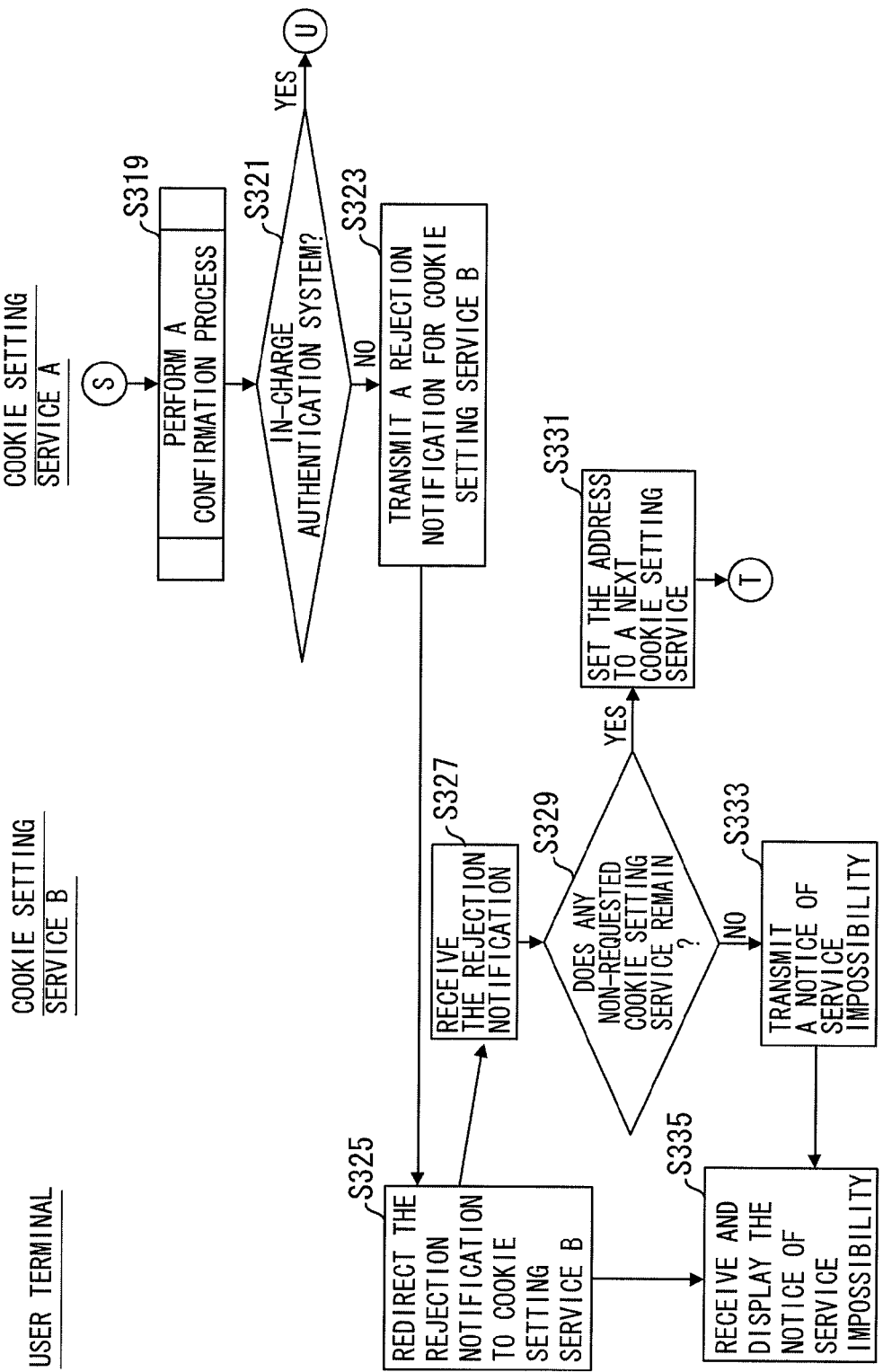
FIG. 26 is a flow chart that shows a seventh processing flow in Embodiment 2 of the present invention.

Processing of FIG. 26 will be described next. Cookie Setting Service A performs a confirmation process (Step S319). The confirmation process is the same as that described with reference to FIG. 13. Cookie Setting Service A makes a judgment based on a result of the confirmation process as to whether Cookie Setting Service A is an in-charge authentication system or not (Step S321). When Step S149 is executed, processing shifts to processing of FIG. 27 through a terminal U because a notice of "in charge" is set. On the other hand, when Step S147 is executed, Cookie Setting Service A transmits a rejection notification message to be redirected to Cookie Setting Service B, to the user terminal because "rejection" is set (Step S323). The Web browser 11 of the user terminal receives the rejection notification message for Cookie Setting Service B from Cookie Setting Service A and redirects the rejection notification message to Cookie Setting Service B (Step S325). Upon reception of the rejection notification message issued by Cookie Setting Service A from the user terminal (Step S327), Cookie Setting Service B judges whether any non-requested cookie setting service remains or not (Step S329).

When any non-requested cookie setting service remains, the address is set to a next non-requested cookie setting service (Step S331) and the situation of this routine goes back to Step S313 through a terminal T. For example, when there is Cookie Setting Service C, processing is made so that a cookie confirmation request message is transmitted to Cookie Setting Service C.

On the other hand, when processing does not shift to processing through a terminal U in Step S321 though cookie confirmation request messages have been already transmitted to all cookie setting services, a notice of service impossibility is transmitted to the user terminal (Step S333). The Web browser 11 of the user terminal receives the notice of service impossibility from Cookie Setting Service B and displays the notice of service impossibility on the display device (Step S335).

Figure 27:
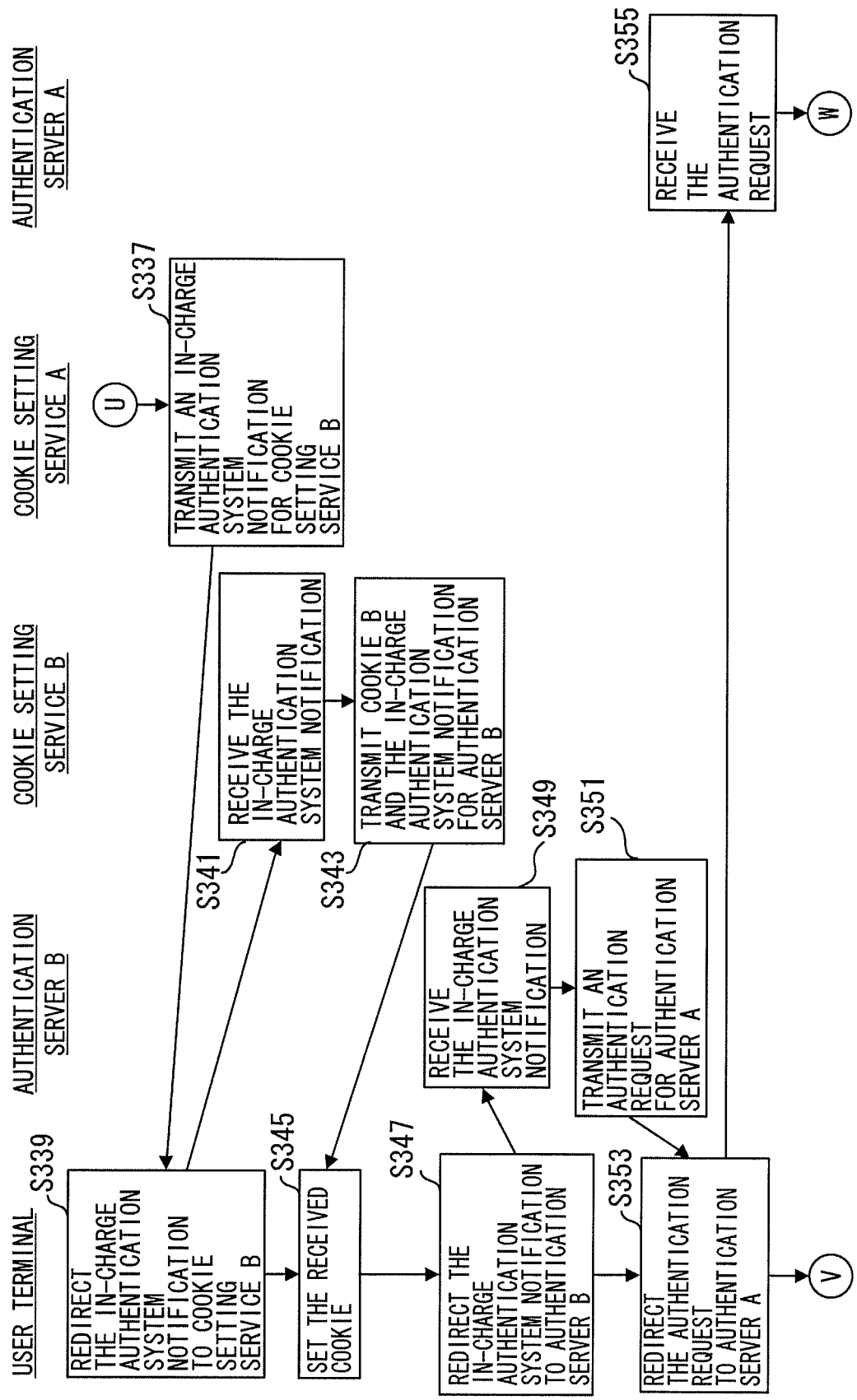
FIG. 27 is a flow chart that shows an eighth processing flow in Embodiment 2 of the present invention.

Processing after the terminal U will be described next with reference to FIG. 27. Cookie Setting Service A transmits an in-charge authentication system notification message to be redirected to Cookie Setting Service B, to the user terminal (Step S337). The in-charge authentication system notification message includes data indicating that Authentication Server A (or System A) is in charge of authentication of the user. The Web browser 11 of the user terminal receives the in-charge authentication system notification message for Cookie Setting Service B from Cookie Setting Service A and redirects the in-charge authentication system notification message to Cookie Setting Service B (Step S339). Cookie Setting Service B receives the in-charge authentication system notification message issued by Cookie Setting Service A from the user terminal (Step S341), generates Cookie B again as represented by the second line in FIG. 19 on the basis of the in-charge authentication system notification message, and transmits the Cookie B and the in-charge authentication system notification message to be redirected to Authentication Server B, to the user terminal (Step S343). The in-charge authentication system notification message includes data indicating that Authentication Server A is in charge.

While the Web browser 11 of the user terminal receives Cookie B from Cookie Setting Service B and sets Cookie B (Step S345), the Web browser 11 of the user terminal transmits the in-charge authentication system notification message issued by Cookie Setting Service B to Authentication Server B (Step S347). Authentication Server B receives the in-charge authentication system notification message issued by Cookie Setting Service B from the user terminal (Step S349). Authentication Server B then specifies Authentication Server A as an in-charge authentication server on the basis of the in-charge authentication system notification message (specifies the URL thereof by Connection List B) and transmits an authentication request message to be redirected to Authentication Server A, to the user terminal (Step S351). Upon reception of the authentication request message for Authentication Server A from Authentication Server B, the Web browser 11 of the user terminal transmits the authentication request message to Authentication Server A (Step S353). Authentication Server A receives the authentication request message issued by Authentication Server B from the user terminal (Step S355). Processing shifts to processing of FIG. 28 through terminals V and W.

Processing of FIG. 28 will be described next. Authentication Server A transmits an authentication server confirmation request message to be redirected to Cookie Setting Service A, to the user terminal (Step S357). The Web browser 11 of the user terminal receives the authentication server confirmation request message for Cookie Setting Service A from Authentication Server A and redirects Cookie A and the authentication server confirmation request message to Cookie Setting Service A (Step S359). Cookie Setting Service A receives Cookie A and the authentication server confirmation request message from the user terminal (Step S361). Cookie Setting Service A confirms the content of Cookie A. That is, Cookie Setting Service A judges whether Cookie A indicates that the user of the user terminal should be authenticated by Authentication Server A. When Cookie A indicates that the user of the user terminal should be authenticated by Authentication Server A, Cookie Setting Service A transmits an authentication execution instruction to be redirected to Authentication Server A, to the user terminal (Step S363).

The Web browser 11 of the user terminal receives the authentication execution instruction for Authentication Server A from Cookie Setting Service A and redirects the authentication execution instruction to Authentication Server A (Step S365). Authentication Server A receives the authentication execution instruction from the user terminal (Step S367). In response to the authentication execution instruction, Authentication Server A transmits an authentication data request message to the user terminal (Step S369). The Web browser 11 of the user terminal receives the authentication data request message from Authentication Server A and displays the authentication data request message on the display device (Step S371).

For example, the user enters an ID and a password as authentication data in ID and password entry fields displayed on the display device. The Web browser 11 of the user terminal accepts the entry of authentication data from the user and transmits the authentication data to Authentication Server A (Step S373). Authentication Server A receives the authentication data from the user terminal (Step S375) and stores the authentication data in a storage device such as a main memory. Authentication Server A then performs an authentication process (Step S377). Processing shifts to processing of FIG. 16 through terminals K and L. Processing of FIG. 16 has been described above and description thereof will be omitted.

By performing the aforementioned processing, even when there arises a situation that a cookie is lost, a process of compensating for the cookie can be performed. Thus, the authentication process is performed without any problem so that the Web system can be used.

As described above, in accordance with the embodiment of the present invention, a plurality of authentication servers belonging to different domains can be connected with one another so that Single Sign-On can be achieved. Furthermore, a plurality of authentication systems belonging to different domains can be connected with one another appropriately.

Although embodiments of the invention have been described above, the invention is not limited to the embodiments. For example, a cookie setting service may be provided in any server of each system. A cookie may include other data than the aforementioned data.

Figure 23:
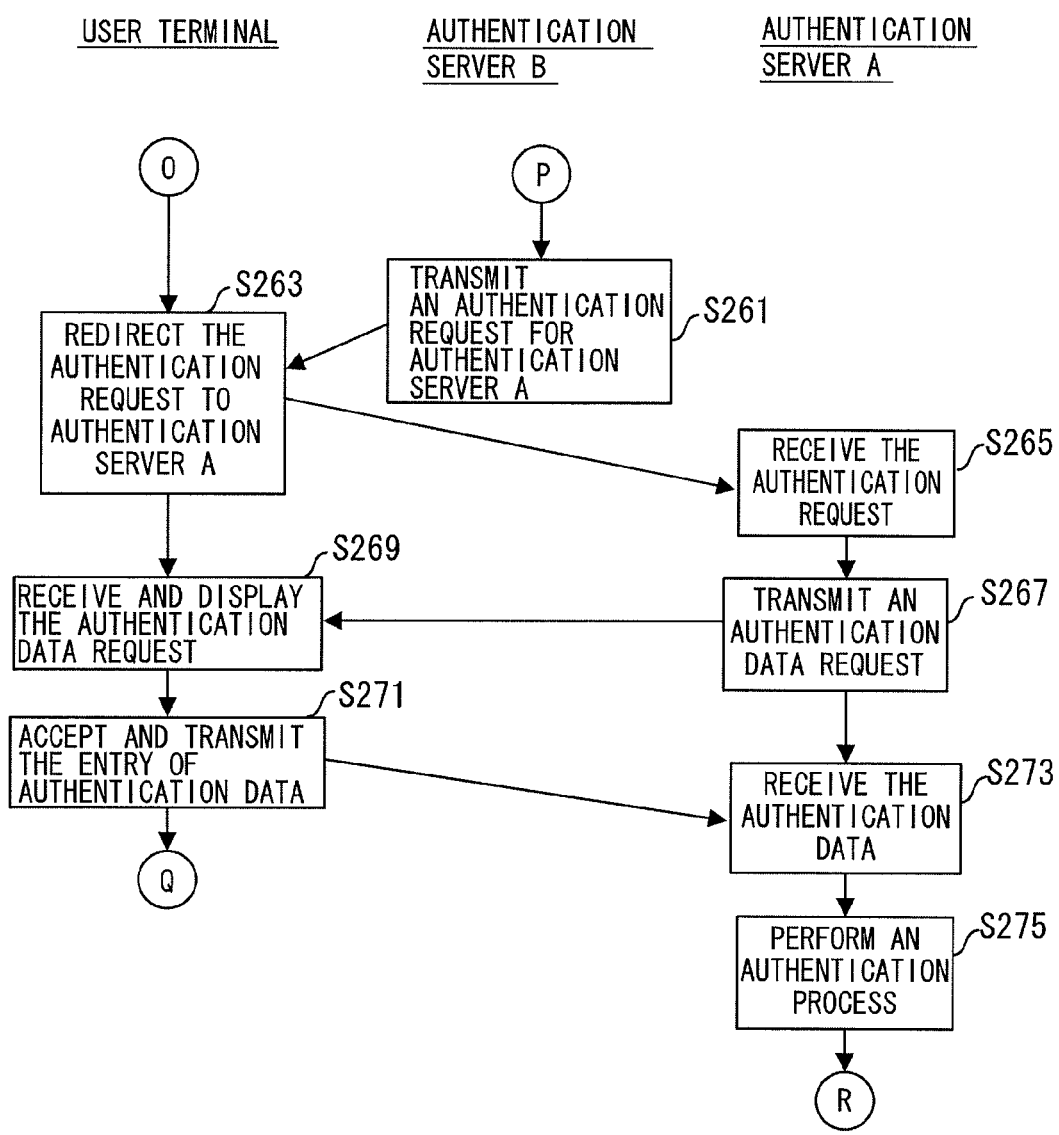
FIG. 23 is a flow chart that shows a fourth processing flow in Embodiment 2 of the present invention.
Figure 24:
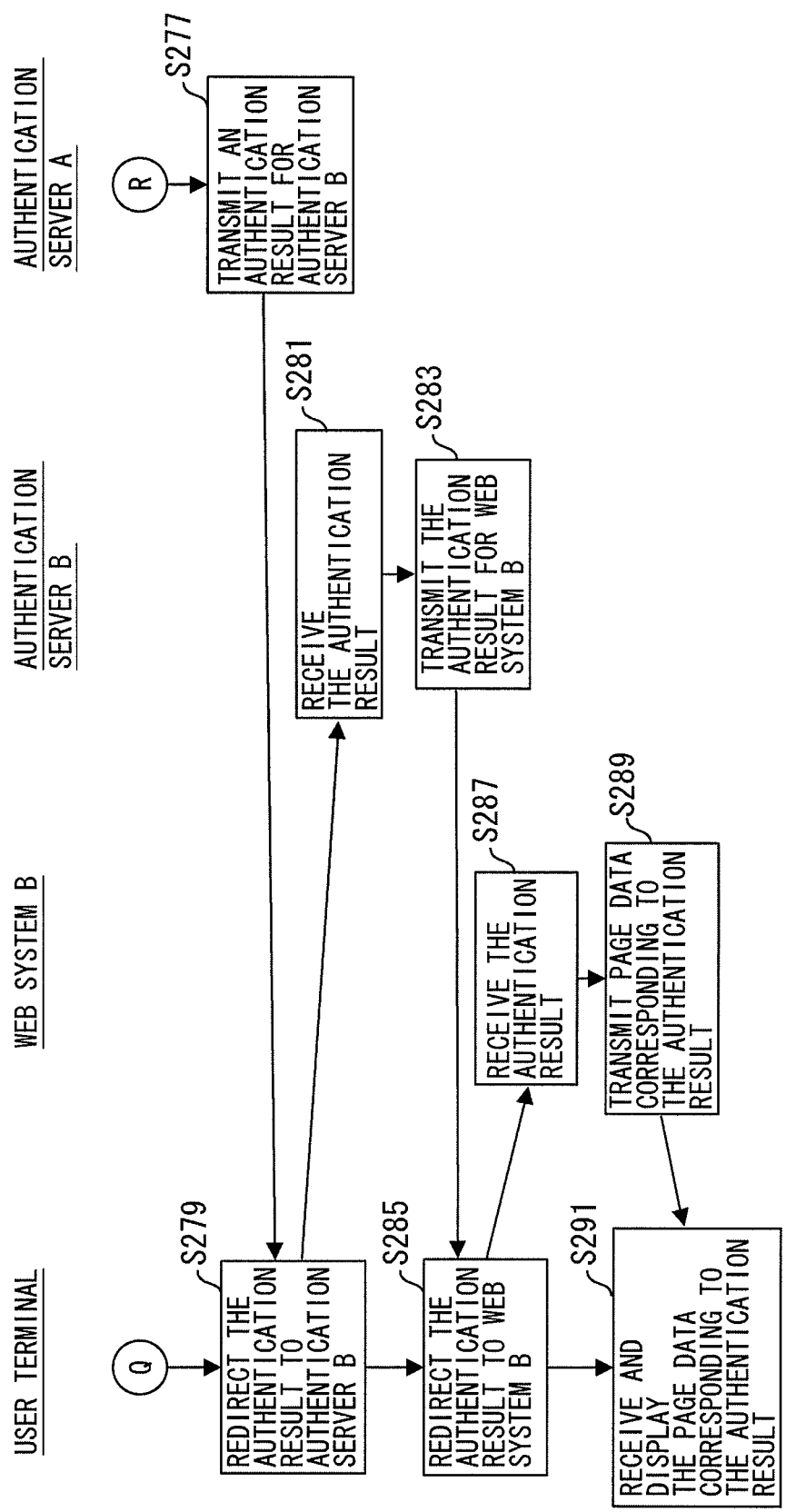
FIG. 24 is a flow chart that shows a fifth processing flow in Embodiment 2 of the present invention.
Figure 25:
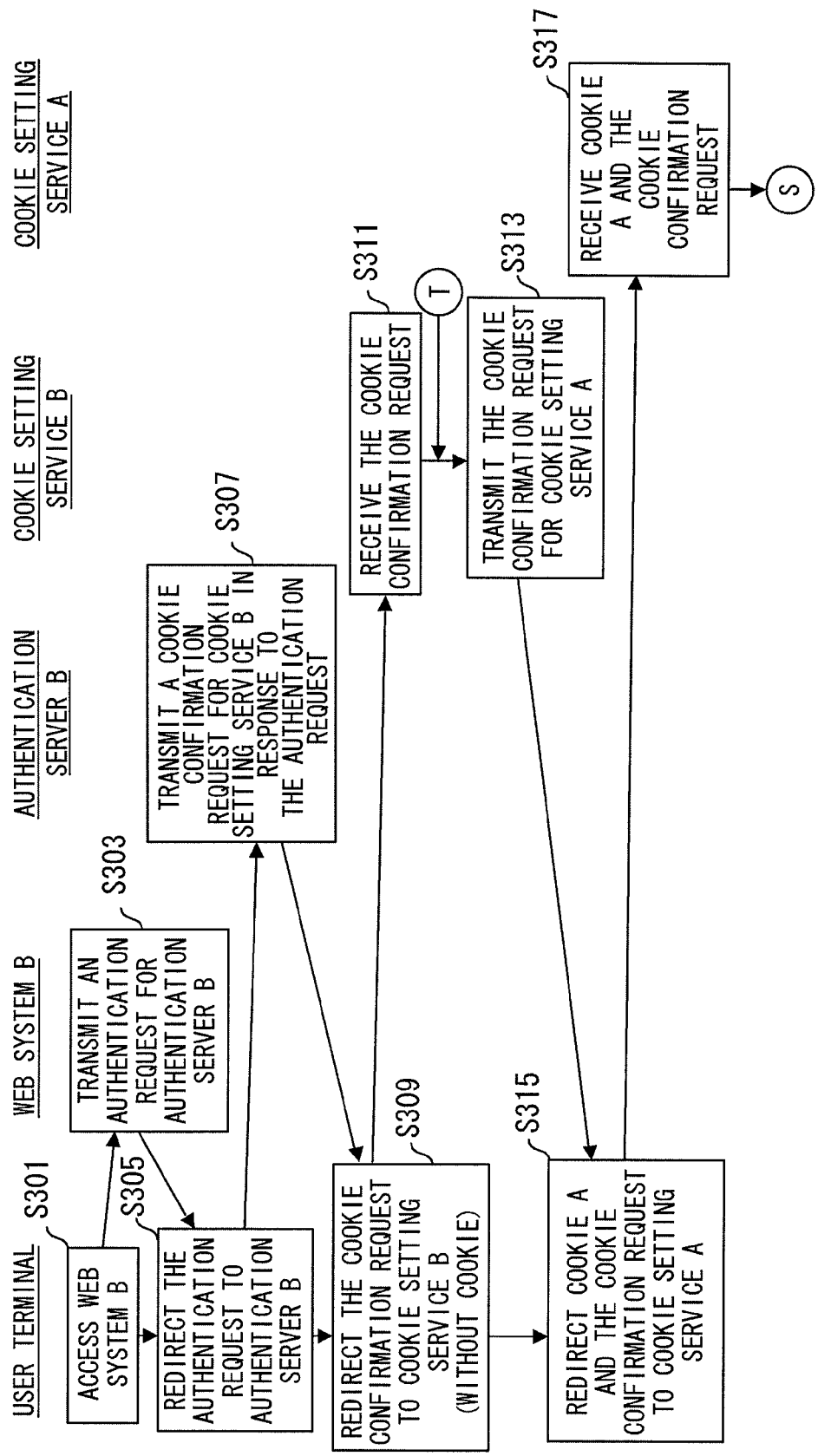
FIG. 25 is a flow chart that shows a sixth processing flow in Embodiment 2 of the present invention.
Figure 28:
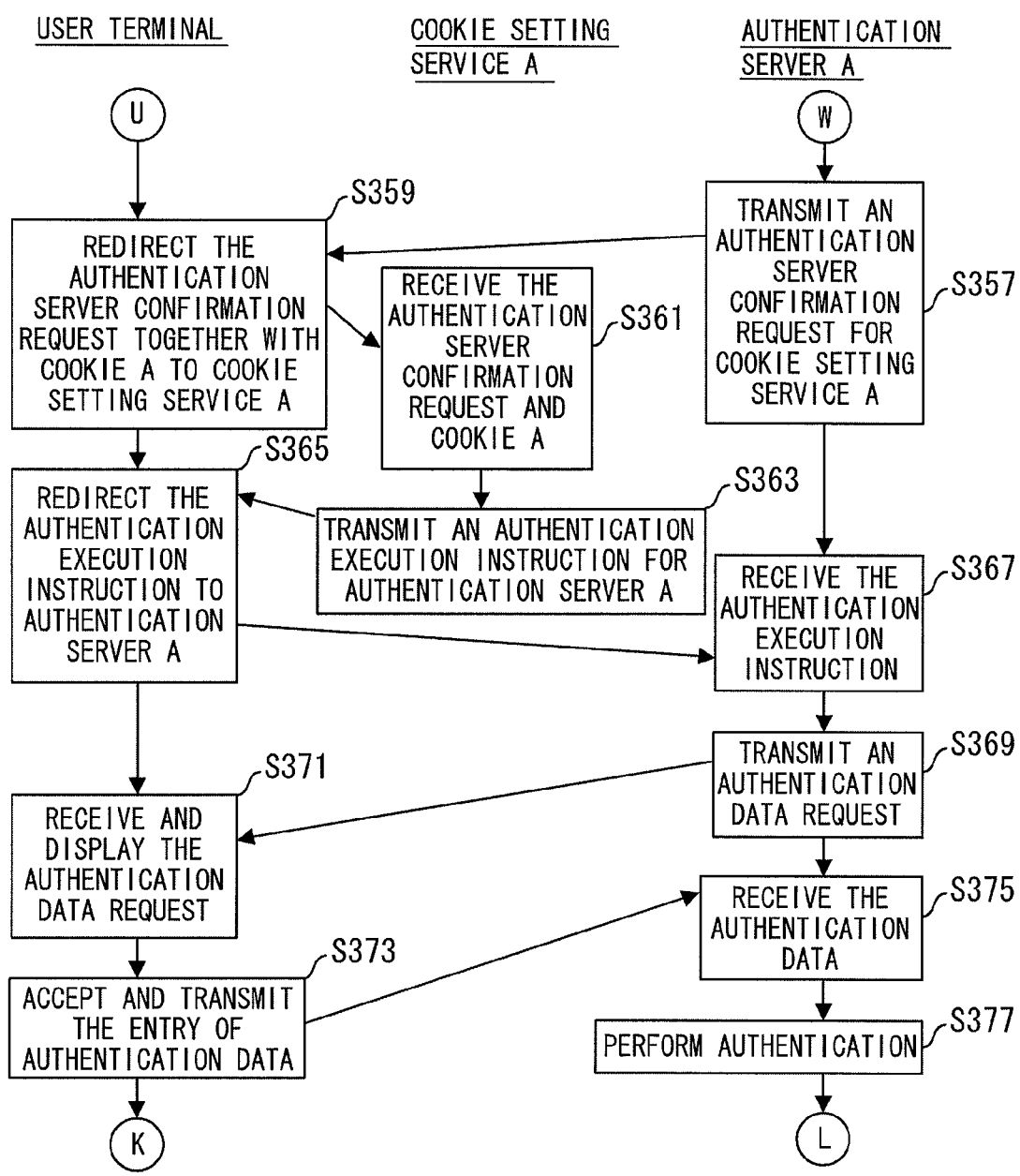
FIG. 28 is a flow chart that shows a ninth processing flow in Embodiment 2 of the present invention.

Steps S357 to S367 in FIG. 28 may be performed after Step S265 in FIG. 23. Steps S359 to S367 in FIG. 28 may be omitted.

Figure 29:
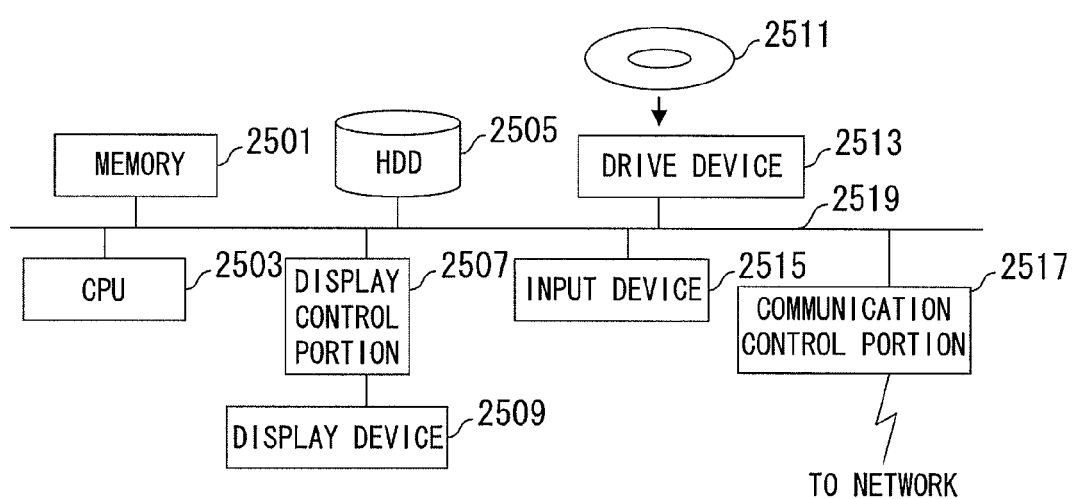
FIG. 29 shows a functional block diagram of a computer.

Incidentally, for example, the user terminal, the authentication server, the Web system or the server in which a cookie setting service is executed, is a computer. As shown in FIG. 29, the computer includes a memory 2501 (storage device), a CPU 2503 (processing portion), a hard disk drive (HDD) 2505, a display control portion 2507 connected to a display device 2509, a drive device 2513 for a removable disk 2511, an input device 2515, and a communication control portion 2517 for connection to a network. These components of the computer are connected to one another by a bus 2519. Application programs including an operation system (OS) and a Web browser are stored in the HDD 2505. When these programs are executed by the CPU 2503, these programs are readout from the HDD 2505 to the memory 2501. As occasion demands, the CPU 2503 controls the display control portion 2507, the communication control portion 2517 and the drive device 2513 to perform necessary operations. Intermediate data under processing are stored in the memory 2501 and stored in the HDD 2505 if necessary. The aforementioned computer achieves the aforementioned various kinds of functions by organic collaboration of hardware such as the CPU 2503, the memory 2501, etc. and OS and necessary application programs.

What is claimed is:

1. An authentication processing method executed in a system having a plurality of groups each having a service system, an authentication server for the service system and a cookie setting service, the method comprising:

operating a first cookie setting service for setting a first cookie in a user terminal in response to a first cookie setting request from the user terminal, the first cookie indicating use of a first authentication server belonging to a first group which is the same group as the first cookie setting service, wherein the first cookie setting service sets the first cookie in the user terminal and transmits information including a second cookie setting request to the user terminal when a list includes information with regard to a second group other than the first group, without transmitting the second cookie setting request to the user terminal when the list does not include information with regard to the second group; and operating a second cookie setting service for setting a second cookie in the user terminal when the second cookie setting service receives the second cookie setting request from the first cookie setting service via the user terminal, the second cookie indicating use of a second authentication server belonging to the second group which is the same group as the second cookie setting service.

2. An authentication processing method according to claim 1, the method further comprising:

operating the first authentication server for performing an authentication process in response to the first cookie when the first authentication server receives (a) an authentication request from a first service system which the first authentication server is in charge of and (b) the first cookie from the user terminal.

3. An authentication processing method according to claim 1, the method further comprising:

operating the second authentication server for transmitting an authentication request for the first authentication server via the user terminal on the basis of the second cookie when the second authentication server receives (a) the authentication request from the second service system which the second authentication server is in charge of and (b) the second cookie from the user terminal; and operating the first authentication server for performing an authentication process in response to the first cookie when the first authentication server receives the authentication request issued by the second authentication server and the first cookie from the user terminal.

4. An authentication processing method according to claim 1, further comprising:

operating the first authentication server for transmitting an authentication system confirmation request for the first cookie setting service via the user terminal when the first authentication server receives an authentication request via the user terminal from the first service system which the first authentication server is in charge of;

operating the first cookie setting service for confirming the first cookie and transmitting an authentication execution request for the first authentication server via the user terminal when the first cookie setting service receives the first cookie and the authentication system confirmation request issued by the first authentication server from the user terminal; and operating the first authentication server for performing an authentication process when the first authentication server receives the authentication execution request issued by the first cookie setting service from the user terminal.

5. An authentication processing method according to claim 1, further comprising:

operating the second authentication server for transmitting an authentication server confirmation request for the second cookie setting service via the user terminal when the second authentication server receives an authentication request via the user terminal from the second service system which the second authentication server is in charge of;

operating the second cookie setting service for confirming the second cookie and transmitting a notice of the first authentication server in charge for the second authentication server via the user terminal when the second cookie setting service receives the second cookie and the authentication server confirmation request issued by the second authentication server from the user terminal;

operating the second authentication server for transmitting an authentication request for the first authentication server via the user terminal when the second authentication server receives the notice of the first authentication server in charge issued by the second cookie setting service from the user terminal; and operating the first authentication server for performing an authentication process when the first authentication server receives the authentication request issued by the second authentication server from the user terminal.

6. An authentication processing method executed in a system having a plurality of groups each having a service system, an authentication server for the service system and a cookie setting service, the method comprising:

operating a first cookie setting service for setting a first cookie in a user terminal in response to a first cookie setting request from the user terminal, the first cookie indicating use of a first authentication server belonging to the same group as the first cookie setting service;

operating a second cookie setting service for setting a second cookie in the user terminal when the second cookie setting service receives a second cookie setting request from the first cookie setting service via the user terminal, the second cookie indicating use of a second authentication server belonging to the same group as the second cookie setting service;

operating the second authentication server for transmitting a cookie setting request for the second cookie setting service via the user terminal when the second authentication server receives an authentication request without the second cookie via the user terminal from the second service system which the second authentication server is in charge of;

operating the second cookie setting service for transmitting a cookie confirmation request for the first cookie setting service via the user terminal when the second cookie setting service receives the cookie setting request issued by the second authentication server from the user terminal;

operating the first cookie setting service for judging whether a predetermined condition including the first cookie is satisfied when the first cookie setting service receives the cookie confirmation request issued by the second cookie setting service and the first cookie from the user terminal, and for transmitting a notice that the first cookie setting service is in charge of authentication of the user for the second cookie setting service via the user terminal when the judgment makes a decision that the predetermined condition is satisfied; and operating the second cookie setting service for setting a new second cookie in the user terminal so that the new second cookie indicates use of the first authentication server when the second cookie setting service receives the authentication in-charge notification issued by the first cookie setting service from the user terminal.

7. An authentication processing method according to claim 6, wherein:

the predetermined condition includes a condition that the second cookie setting service is listed in a reliance list which is determined in advance.

8. An authentication processing method executed in a system having a plurality of groups each having a service system, an authentication server for the service system and a cookie setting service, the method comprising:

operating a first cookie setting service for setting a first cookie in a user terminal in response to a first cookie setting request from the user terminal, the first cookie indicating use of a first authentication server belonging to the same group as the first cookie setting service;

operating a second cookie setting service for setting a second cookie in the user terminal when the second cookie setting service receives a second cookie setting request from the first cookie setting service via the user terminal, the second cookie indicating use of a second authentication server belonging to the same group as the second cookie setting service;

operating the second authentication server for transmitting an authentication system confirmation request for the second cookie setting service via the user terminal when the second authentication server receives an authentication request via the user terminal from the second service system which the second authentication server is in charge of;

operating the second cookie setting service for transmitting a cookie confirmation request for the first cookie setting service via the user terminal when the second cookie setting service receives the authentication system confirmation request issued by the second authentication server without the second cookie from the user terminal;

operating the first cookie setting service for judging whether a predetermined condition including the first cookie is satisfied when the first cookie setting service receives the first cookie and the cookie confirmation request issued by the second cookie setting service from the user terminal, and for transmitting a notice that the first cookie setting service is in charge of authentication of the user for the second cookie setting service via the user terminal when the predetermined condition is satisfied;

operating the second cookie setting service for setting a new second cookie in the user terminal so that the new second cookie indicates use of the first authentication server and for transmitting a notice of the first authentication server in charge for the second authentication server via the user terminal when the second cookie setting service receives the authentication in-charge notification issued by the first cookie setting service via the user terminal; and operating the second authentication server for transmitting an authentication request for the first authentication server via the user terminal when the second authentication server receives the notice of the first authentication server in charge issued by the second cookie setting service from the user terminal.

9. An authentication processing method according to claim 8, wherein:

the predetermined condition includes a condition that the second cookie setting service is listed in a reliance list which is determined in advance.

10. An authentication system comprising:

a first apparatus that provides a first authentication server for a first service system;

a second apparatus that provides a first cookie setting service;

a third apparatus that provides a second authentication server for a second service system; and a fourth apparatus that provides a second cookie setting service, wherein:

the first cookie setting service sets a first cookie in a user terminal in response to a first cookie setting request from the user terminal, the first cookie indicating use of the first authentication server belonging to a first group which is the same group as the first cookie setting service, wherein the first cookie setting service sets the first cookie in the user terminal and transmits information a second cookie setting request to the user terminal when a list includes information with regard to a second group other than the first group, without transmitting the second cookie setting request to the user terminal when the list does not include information with regard to the second group; and the second cookie setting service sets a second cookie in the user terminal when receiving the second cookie setting request from the first cookie setting service via the user terminal, the second cookie indicating use of a second authentication server belonging to the second group which is the same group as the second cookie setting service.

11. An authentication system according to claim 10, wherein:

the first authentication server performs an authentication process in response to the first cookie when receiving (a) an authentication request from the first service system which the first authentication server is in charge of and (b) the first cookie from the user terminal.

12. An authentication system according to claim 10, wherein:

the second authentication server transmits an authentication request for the first authentication server via the user terminal on the basis of the second cookie when receiving (a) the authentication request from the second service system which the second authentication server is in charge of and (b) the second cookie from the user terminal; and the first authentication server performs an authentication process in response to the first cookie when receiving the authentication request issued by the second authentication server and the first cookie from the user terminal.

13. An authentication system according to claim 10, wherein:

the second authentication server transmits a cookie setting request for the second cookie setting service via the user terminal when receiving an authentication request without the second cookie via the user terminal from the second service system which the second authentication server is in charge of;

the second cookie setting service transmits a cookie confirmation request for the first cookie setting service via the user terminal when receiving the cookie setting request issued by the second authentication server from the user terminal;

the first cookie setting service judges whether a predetermined condition including the first cookie is satisfied when receiving the cookie confirmation request issued by the second cookie setting service and the first cookie from the user terminal, and transmits a notice that the first cookie setting service is in charge of authentication of the user for the second cookie setting service via the user terminal when the judgment makes a decision that the predetermined condition is satisfied; and the second cookie setting service sets a new second cookie in the user terminal when receiving the authentication in-charge notification issued by the first cookie setting service from the user terminal, the new second cookie indicating use of the first authentication server.

14. An authentication system according to claim 13, wherein:

the predetermined condition includes a condition that the second cookie setting service is listed in a reliance list which is determined in advance.

15. An authentication system according to claim 10, wherein:

the first authentication server transmits an authentication system confirmation request for the first cookie setting service via the user terminal when receiving an authentication request via the user terminal from the first service system which the first authentication server is in charge of;

the first cookie setting service confirms the first cookie and transmits an authentication execution request for the first authentication server via the user terminal when receiving the first cookie and the authentication system confirmation request issued by the first authentication server from the user terminal; and the first authentication server performs an authentication process when receiving the authentication execution request issued by the first cookie setting service from the user terminal.

16. An authentication system according to claim 10, wherein:

the second authentication server transmits an authentication server confirmation request for the second cookie setting service via the user terminal when receiving an authentication request via the user terminal from the second service system which the second authentication server is in charge of;

the second cookie setting service confirms the second cookie and transmits a notice of the first authentication server in charge for the second authentication server via the user terminal when receiving the second cookie and the authentication server confirmation request issued by the second authentication server from the user terminal;

the second authentication server transmits an authentication request for the first authentication server via the user terminal when receiving the notice of the first authentication server in charge issued by the second cookie setting service from the user terminal; and the first authentication server performs an authentication process when receiving the authentication request issued by the second authentication server from the user terminal.

17. An authentication system according to claim 10, wherein:

the second authentication server transmits an authentication system confirmation request for the second cookie setting service via the user terminal when receiving an authentication request via the user terminal from the second service system which the second authentication server is in charge of;

the second cookie setting service transmits a cookie confirmation request for the first cookie setting service via the user terminal when receiving the authentication system confirmation request issued by the second authentication server without the second cookie from the user terminal;

the first cookie setting service judges whether a predetermined condition including the first cookie is satisfied when receiving the first cookie and the cookie confirmation request issued by the second cookie setting service from the user terminal, and transmits a notice that the first cookie setting service is in charge of authentication of the user for the second cookie setting service via the user terminal when the predetermined condition is satisfied;

the second cookie setting service sets a new second cookie in the user terminal so that the new second cookie indicates use of the first authentication server and transmits a notice of the first authentication server in charge for the second authentication server via the user terminal when receiving the authentication in-charge notification issued by the first cookie setting service via the user terminal; and the second authentication server transmits an authentication request for the first authentication server via the user terminal when receiving the notice of the first authentication server in charge issued by the second cookie setting service from the user terminal.

18. An authentication system according to claim 17, wherein:

the predetermined condition includes a condition that the second cookie setting service is listed in a reliance list which is determined in advance.

19. An authentication system according to claim 17, wherein:

the first cookie further indicates that a domain, which include the first cookie setting service and the first authentication server, is included in an effective range of the first cookie; and the second cookie further indicates that a domain, which include the second cookie setting service and the second authentication server, is included in an effective range of the second cookie.

* * * * *